United States Patent
Niu

(10) Patent No.: US 9,327,402 B2
(45) Date of Patent: May 3, 2016

(54) ROBOT, ROBOT CONTROL DEVICE, AND ROBOT SYSTEM

(71) Applicant: Seiko Epson Corporation, Tokyo (JP)

(72) Inventor: Akio Niu, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/195,937

(22) Filed: Mar. 4, 2014

(65) Prior Publication Data

US 2014/0309779 A1   Oct. 16, 2014

(30) Foreign Application Priority Data

Apr. 10, 2013  (JP) .................................. 2013-082275

(51) Int. Cl.
*G05B 19/00* (2006.01)
*G05B 15/00* (2006.01)
*B25J 9/16* (2006.01)
*B25J 9/04* (2006.01)
*B25J 13/08* (2006.01)

(52) U.S. Cl.
CPC ................ *B25J 9/1651* (2013.01); *B25J 9/046* (2013.01); *B25J 13/088* (2013.01)

(58) Field of Classification Search
USPC ........ 700/258, 263, 245, 262; 395/98, 97, 80, 395/86; 901/27, 14, 15, 28, 46, 30; 702/94; 219/137.9; 318/568.11; 74/490.02
See application file for complete search history.

(56) References Cited

U.S. PATENT DOCUMENTS

| 4,937,759 | A | * | 6/1990 | Vold .............................. 700/262 |
| 5,550,953 | A | * | 8/1996 | Seraji ............................ 700/263 |
| 5,710,870 | A | * | 1/1998 | Ohm et al. .................... 700/263 |
| 5,781,705 | A | * | 7/1998 | Endo ............................. 700/262 |
| 5,944,476 | A |   | 8/1999 | Bacchi et al. |
| 6,216,056 | B1 |   | 4/2001 | Ito et al. |
| 6,343,242 | B1 |   | 1/2002 | Nomura et al. |
| 6,922,034 | B2 | * | 7/2005 | Hirose ..................... 318/568.11 |
| 7,202,442 | B2 | * | 4/2007 | Nakagiri et al. ........... 219/137.9 |
| 7,233,872 | B2 | * | 6/2007 | Shibasaki et al. .............. 702/94 |
| 7,756,606 | B2 | * | 7/2010 | Nakajima et al. ............. 700/245 |

(Continued)

FOREIGN PATENT DOCUMENTS

CN   CN-102501242 A   6/2012
EP        2703130 A2      3/2014

(Continued)

OTHER PUBLICATIONS

A3G4250D MEMS motion sensor:3-axis digital output gyroscope Feb. 2012, ST Microelectronics, Doc 022768 Rev3, pp. 1-45.

(Continued)

*Primary Examiner* — Ronnie Mancho
(74) *Attorney, Agent, or Firm* — Harness, Dickey & Pierce, P.L.C.

(57) ABSTRACT

A robot includes a base, a first arm rotatably connected to the base around a first rotating axis, a second arm rotatably connected to the first arm around a second rotating axis orthogonal to the first rotating axis, a third arm rotatably connected to the second arm around a third rotating axis parallel to the second rotating axis, a first angular velocity sensor provided in the first arm and having an angular velocity detection axis parallel to the first rotating axis, and a second angular velocity sensor provided in the second arm and having an angular velocity detection axis parallel to the third rotating axis.

18 Claims, 17 Drawing Sheets

(56) References Cited

U.S. PATENT DOCUMENTS

| | | |
|---|---|---|
| 7,765,023 B2 | 7/2010 | Oaki et al. |
| 8,631,720 B2 * | 1/2014 | Nakagiri et al. ........... 74/490.02 |
| 2003/0020461 A1 | 1/2003 | Nomura et al. |
| 2003/0178964 A1 | 9/2003 | Challoner |
| 2005/0113973 A1 | 5/2005 | Endo et al. |
| 2005/0166413 A1 | 8/2005 | Crampton |
| 2005/0240307 A1 | 10/2005 | Kuroki et al. |
| 2005/0246061 A1 | 11/2005 | Oaki et al. |
| 2007/0288124 A1 | 12/2007 | Nagata et al. |
| 2008/0246428 A1 | 10/2008 | Shimada |
| 2009/0149993 A1 | 6/2009 | Neki et al. |
| 2010/0113980 A1 | 5/2010 | Herr et al. |
| 2010/0256812 A1 | 10/2010 | Tsusaka et al. |
| 2010/0286823 A1 | 11/2010 | Neki et al. |
| 2010/0318223 A1 | 12/2010 | Motoyoshi et al. |
| 2011/0004343 A1 | 1/2011 | Iida |
| 2011/0082566 A1 | 4/2011 | Herr et al. |
| 2011/0107866 A1 | 5/2011 | Oka et al. |
| 2011/0257785 A1 | 10/2011 | Nihei et al. |
| 2012/0126664 A1 | 5/2012 | Ogura et al. |
| 2012/0174317 A1 * | 7/2012 | Saracen ............... A61B 6/0457 5/601 |
| 2012/0215356 A1 | 8/2012 | Igarashi et al. |
| 2012/0215357 A1 | 8/2012 | Igarashi et al. |
| 2012/0272774 A1 | 11/2012 | Kirihara et al. |
| 2012/0296471 A1 | 11/2012 | Inaba et al. |
| 2013/0041502 A1 * | 2/2013 | Shi ...................... B25J 15/0009 700/245 |
| 2013/0053866 A1 * | 2/2013 | Leung ................... B25J 9/1689 606/130 |
| 2013/0073086 A1 | 3/2013 | Motoyoshi et al. |
| 2013/0079929 A1 | 3/2013 | Lim et al. |
| 2013/0131864 A1 * | 5/2013 | Jody ........................ B25J 9/161 700/245 |
| 2013/0204437 A1 * | 8/2013 | Koselka ................ A01D 46/30 700/259 |
| 2014/0249670 A1 * | 9/2014 | Yamane ................. B25J 9/1602 700/245 |
| 2014/0316564 A1 * | 10/2014 | Nakamura ............. G05B 19/19 700/245 |
| 2015/0081092 A1 * | 3/2015 | Jacobsen ................ B25J 9/065 700/245 |
| 2015/0190925 A1 * | 7/2015 | Hoffman ................. B25J 9/161 700/257 |
| 2016/0008988 A1 * | 1/2016 | Kennedy .................... B25J 9/06 414/738 |
| 2016/0015461 A1 * | 1/2016 | Farritor .............. A61B 19/2203 606/130 |

FOREIGN PATENT DOCUMENTS

| | | |
|---|---|---|
| EP | 2703131 A2 | 3/2014 |
| JP | 2011-136395 A | 7/2011 |
| WO | WO-2010-019310 A1 | 2/2010 |

OTHER PUBLICATIONS

Analog Devices, "ADIS16120," 2007, Rev. B, pp. 1-12.

Wilcoxon Research "Vibration sensor wiring and cabling," Aug. 2008, pp. 1-12.

Extended European Search Report for Application No. EP 14162332.2 dated Feb. 4, 2016 (9 pages).

Extended European Search Report for Application No. EP 13182172.0 dated Feb. 11, 2016 (7 pages).

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

In a robot described in JP-A-2011-136395, a six-axis sensor which detects acceleration in the directions of an X axis, a Y axis, and a Z axis orthogonal to each other and acceleration around the X axis, the Y axis, and the Z axis is provided in a front end portion, that is, a sixth link on a front-most end side. A vibrational component of angular velocity around an intended axis is obtained for each link on the basis of the detection result of the six-axis sensor. As such, control for suppressing vibration is performed. The vibrational component of the angular velocity of the link is called "torsional angular velocity", "vibrational angular velocity", or the like.

In the robot described in JP-A-2011-136395, since the posture of the six-axis sensor changes with the motion of the robot, it is necessary to perform coordinate axis transformation or the like, called Jacobi's transformation, from the detection result of the six-axis sensor, and to obtain the vibrational component of the angular velocity of each link. Moreover, it is necessary to perform computation in conformity with the rotation angle of a motor which changes every moment.

Since complicated and enormous computation processing is required, there is a problem in that a control device which has a high-performance and an expensive CPU (Central Processing Unit) or the like is required. This causes an increase in cost.

Also, since the complicated and enormous computation processing is required, there is a problem in that a computation error is likely to occur. If such an error occurs, it is not possible to sufficiently suppress vibration due to the computation error.

SUMMARY

An advantage of some aspects of the invention is that it provides a robot, a robot control device, and a robot system capable of suppressing vibration easily and reliably.

An aspect of the invention is directed to a robot including a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, a first angular velocity sensor which is provided in the first arm and in which an angular velocity detection axis is parallel to the first rotating axis, and a second angular velocity sensor which is provided in the second arm and in which an angular velocity detection axis is parallel to the third rotating axis.

Accordingly, it is possible to suppress vibration easily and reliably.

That is, first, the angular velocity of the first arm can be detected by the first angular velocity sensor. The angular velocity of the second arm including the vibrational component of the third arm can be detected by the second angular velocity sensor. Then, it is possible to suppress vibration on the basis of these detection results.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Since the third rotating axis and the second rotating axis are orthogonal to the first rotating axis or are parallel to the axis orthogonal to the first rotating axis, even if the posture of the robot changes, for example, even if the first arm rotates or the second arm rotates, the detection axis of the angular velocity of the second angular velocity sensor is constant. For this reason, it is not necessary to correct the angular velocity of the second arm detected by the second angular velocity sensor with the direction of the second angular velocity sensor.

Accordingly, complicated and enormous computation is not required. Therefore, a computation error is less likely to occur, and it is possible to reliably suppress vibration and to increase a response speed in the control of the robot.

Since the angular velocity of the second arm including the vibrational component of the third arm is detected by the second angular velocity sensor, it is possible to suppress vibration more reliably.

It is thus possible to reduce the number of angular velocity sensors, to reduce cost, and to simplify the configuration compared to a case where the angular velocity sensor is provided in the third arm.

In the robot according to the aspect of the invention, it is preferable that a speed reducer which is located on the third rotating axis is arranged in at least one of the second arm and the third arm.

Accordingly, it is possible to perform the rotation of the third arm with respect to the second arm with high precision. In this way, if the second arm and the third arm are connected together through the speed reducer, even if an angular velocity sensor is provided in the third arm, there may be a case where it is not possible to secure enough space to arrange the angular velocity sensor in the third arm. Even if an angular velocity sensor can be arranged in the third arm, it is desirable to extract a wiring from the angular velocity sensor to the second arm through the speed reducer. For this reason, it is desirable to secure a space for the wiring in the speed reducer, and there is concern that the speed reducer increases in size and rigidity is degraded.

In the robot according to the aspect of the invention, it is preferable that the robot further includes a first angular velocity sensor unit having a first housing, and the first angular velocity sensor and a circuit unit which are provided in the first housing, the circuit unit AD converting and transmitting a signal output from the first angular velocity sensor, and a second angular velocity sensor unit having a second housing, and the second angular velocity sensor and a circuit unit which are provided in the second housing, the circuit unit AD converting and transmitting a signal output from the second angular velocity sensor, in which the first angular velocity sensor unit is provided in the first arm, and the second angular velocity sensor unit is provided in the second arm.

Accordingly, it is possible to simplify the configuration compared to a case where the circuit unit is provided separately.

In the robot according to the aspect of the invention, it is preferable that the distance between the third rotating axis and the second angular velocity sensor unit is shorter than the distance between the second rotating axis and the second angular velocity sensor unit.

Accordingly, it is possible to detect the vibrational component of the third arm widely.

In the robot according to the aspect of the invention, it is preferable that each appearance of the first housing and the second housing is a rectangular parallelepiped, the detection axis of the angular velocity of the first angular velocity sensor matches (is aligned with) the normal to the largest surface of the rectangular parallelepiped of the first housing, and the detection axis of the angular velocity of the second angular velocity sensor matches (is aligned with) the normal to the largest surface of the rectangular parallelepiped of the second housing.

Accordingly, it is possible to recognize the directions of the detection axis of the angular velocity of the first angular velocity sensor and the detection axis of the angular velocity of the second angular velocity sensor easily and reliably, and to allow the first angular velocity sensor and the second angular velocity sensor to take an appropriate posture easily.

In the robot according to the aspect of the invention, it is preferable that each of the first angular velocity sensor and the second angular velocity sensor has a gyro element, when two orthogonal axes are set as a first axis and a second axis, the gyro element has a base portion, a pair of detection vibrating arms which extend from the base portion in parallel with the first axis and in opposite directions, a pair of connecting arms which extend from the base portion in parallel with the second axis and in opposite directions, and a pair of driving vibrating arms which extend from the front end portions or the middle of the respective connecting arms in parallel with the first axis and in opposite directions.

Accordingly, the first and second angular velocity sensors are compact and have high detection precision. In this gyro element, since the detection axis matches (is aligned with) the normal to the plate surface (the surface including the first axis and the second axis), as described above, it becomes easy to cause the detection axis to match the normal to the largest surface of the rectangular parallelepiped.

In the robot according to the aspect of the invention, it is preferable that the first housing has an attachment portion to be attached to the first arm in a corner portion of the first housing, and the second housing has an attachment portion to be attached to the second arm in a corner portion of the second housing.

Accordingly, it is possible to reliably attach the first angular velocity sensor unit to the first arm and to reliably attach the second angular velocity sensor unit to the second arm.

In the robot according to the aspect of the invention, it is preferable that the robot further includes a fixing member which is conductive and fixes the attachment portion of the first housing to the first arm, the circuit unit of the first angular velocity sensor unit being grounded to the first arm by the fixing member, and a fixing member which is conductive and fixes the attachment portion of the second housing to the second arm, the circuit unit of the second angular velocity sensor unit being grounded to the second arm by the fixing member.

Accordingly, it is possible to reduce the number of components and to simplify the configuration.

In the robot according to the aspect of the invention, it is preferable that the first arm has a housing and an arm-side attachment portion formed integrally with the housing, and the first angular velocity sensor unit is attached directly to the arm-side attachment portion.

Accordingly, it is possible to allow the first angular velocity sensor unit to rotate integrally with the first arm reliably.

In the robot according to the aspect of the invention, it is preferable that the second arm has a housing and an arm-side attachment portion formed integrally with the housing, and the second angular velocity sensor unit is attached directly to the arm-side attachment portion.

Accordingly, it is possible to allow the second angular velocity sensor unit to rotate integrally with the second arm reliably.

In the robot according to the aspect of the invention, it is preferable that the robot further includes a cable which is provided in the first arm and supplies power to the robot, in which the first angular velocity sensor is arranged in an end portion of the first arm opposite to the cable.

Accordingly, it is possible to prevent the first angular velocity sensor from being affected by noise from the cable, and to prevent a circuit or a wiring on the first angular velocity sensor side from being short-circuited by the cable.

In the robot according to the aspect of the invention, it is preferable that the robot further includes a cable which is provided in the second arm and supplies power to the robot, in which the second angular velocity sensor is arranged in an end portion of the second arm opposite to the cable.

Accordingly, it is possible to prevent the second angular velocity sensor from being affected by noise from the cable, and to prevent a circuit or a wiring on the second angular velocity sensor side from being short-circuited by the cable.

In the robot according to the aspect of the invention, it is preferable that the robot further includes a fourth arm which is connected to the third arm rotatably around a fourth rotating axis, which is an axis orthogonal to the third rotating axis or an axis parallel to the axis orthogonal to the third rotating axis, as a rotation center, a fifth arm which is connected to the fourth arm rotatably around a fifth rotating axis, which is an axis orthogonal to the fourth rotating axis or an axis parallel to the axis orthogonal to the fourth rotating axis, as a rotation center, and a sixth arm which is connected to the fifth arm rotatably around a sixth rotating axis, which is an axis orthogonal to the fifth rotating axis or an axis parallel to the axis orthogonal to the fifth rotating axis, as a rotation center.

Accordingly, a more complicated motion can be easily performed.

In the robot according to the aspect of the invention, it is preferable that the first rotating axis matches (is aligned with) the normal to an installation surface of the base.

Accordingly, it is possible to easily control the robot.

Another aspect of the invention is directed to a robot control device which controls the actuation of a robot, in which the robot includes a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, and a third arm which is connected to the second arm rotatably around a third rotating axis, which is an axis parallel to the second rotating axis, as a rotation center, and the robot control device includes a receiving unit which receives a first signal output from a first angular velocity sensor provided in the first arm with an angular velocity detection axis parallel to the first rotating axis and a second signal output from a second angular velocity sensor provided in the second arm with an angular velocity detection axis parallel to the third rotating axis, a calculation unit which obtains a vibrational component of the angular velocity of the first arm and a vibrational component of the angular velocity of the second arm on the basis of the first signal and the second signal received by the receiving unit, and a control unit which controls the actuation of the robot on the basis of the vibrational component of the angular velocity of the first arm and the vibrational component of the angular velocity of the second arm obtained by the calculation unit.

Accordingly, it is possible to suppress vibration easily and reliably.

That is, first, the vibrational component of the angular velocity of the first arm can be obtained by the calculation unit on the basis of the angular velocity of the first arm detected by the first angular velocity sensor. The vibrational component of the angular velocity of the second arm can be obtained by the calculation unit on the basis of the angular velocity of the second arm including the vibrational component of the angular velocity of the third arm detected by the second angular velocity sensor. Then, it is possible to suppress vibration on the basis of the vibrational component of the angular velocity of the first arm and the vibrational component of the angular velocity of the second arm.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Even if the posture of the robot changes, for example, even if the first arm rotates or the second arm rotates, the detection axis of the angular velocity of the second angular velocity sensor is constant. For this reason, it is not necessary to correct the angular velocity of the second arm detected by the second angular velocity sensor with the direction of the second angular velocity sensor.

Accordingly, complicated and enormous computation is not required. Therefore, a computation error is less likely to occur, and it is possible to reliably suppress vibration and to increase a response speed in the control of the robot.

Since the angular velocity of the second arm including the vibrational component of the angular velocity of the third arm is detected by the second angular velocity sensor, instead of the angular velocity of the second arm, it is possible to more reliably suppress vibration.

Still another aspect of the invention is directed to a robot system including the robot according to the aspect of the invention, and a robot control device which controls the actuation of the robot.

Accordingly, it is possible to suppress vibration easily and reliably.

That is, first, the angular velocity of the first arm can be detected by the first angular velocity sensor. The angular velocity of the second arm including the vibrational component of the angular velocity of the third arm can be detected by the second angular velocity sensor. Then, it is possible to suppress vibration on the basis of these detection results.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Even if the posture of the robot changes, for example, even if the first arm rotates or the second arm rotates, the detection axis of the angular velocity of the second angular velocity sensor is constant. For this reason, it is not necessary to correct the angular velocity of the second arm detected by the second angular velocity sensor with the direction of the second angular velocity sensor.

Accordingly, complicated and enormous computation is not required. Therefore, a computation error is less likely to occur, and it is possible to reliably suppress vibration and to increase a response speed in the control of the robot.

Since the angular velocity of the second arm including the vibrational component of the angular velocity of the third arm is detected by the second angular velocity sensor, instead of the angular velocity of the second arm, it is possible to more reliably suppress vibration.

Thus, it is possible to reduce the number of angular velocity sensors, to reduce cost, and to simplify the configuration compared to a case where the angular velocity sensor is provided in the third arm.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a robot, a robot control device, and a robot system according to the invention will be described in detail on the basis of a preferred embodiment shown in the accompanying drawings.

Figure 1:
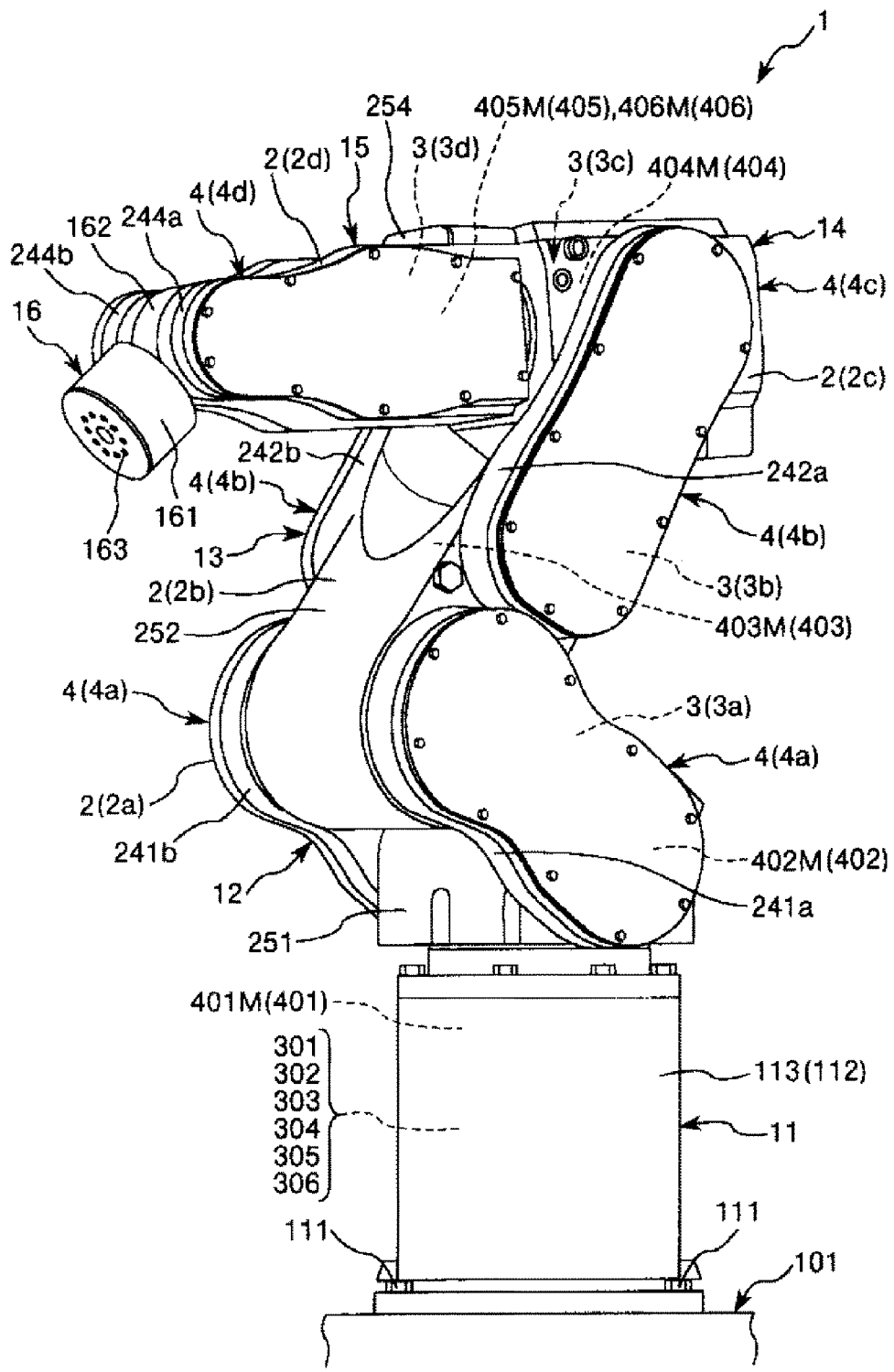
FIG. 1 is a perspective view when a robot according to an embodiment of the invention is viewed from a front side.
Figure 2:
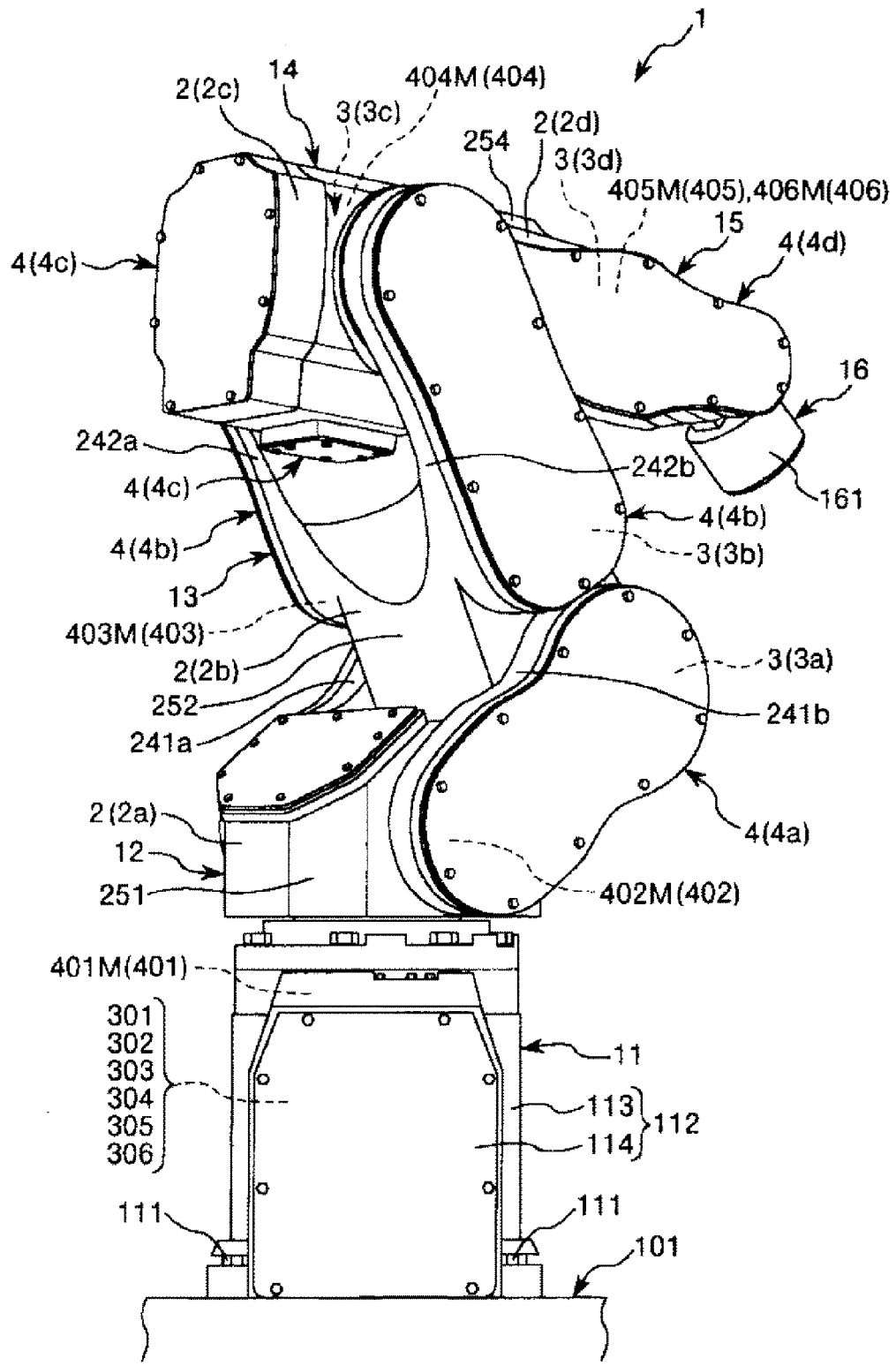
FIG. 2 is a perspective view when the robot shown in FIG. 1 is viewed from a rear side.
Figure 3:
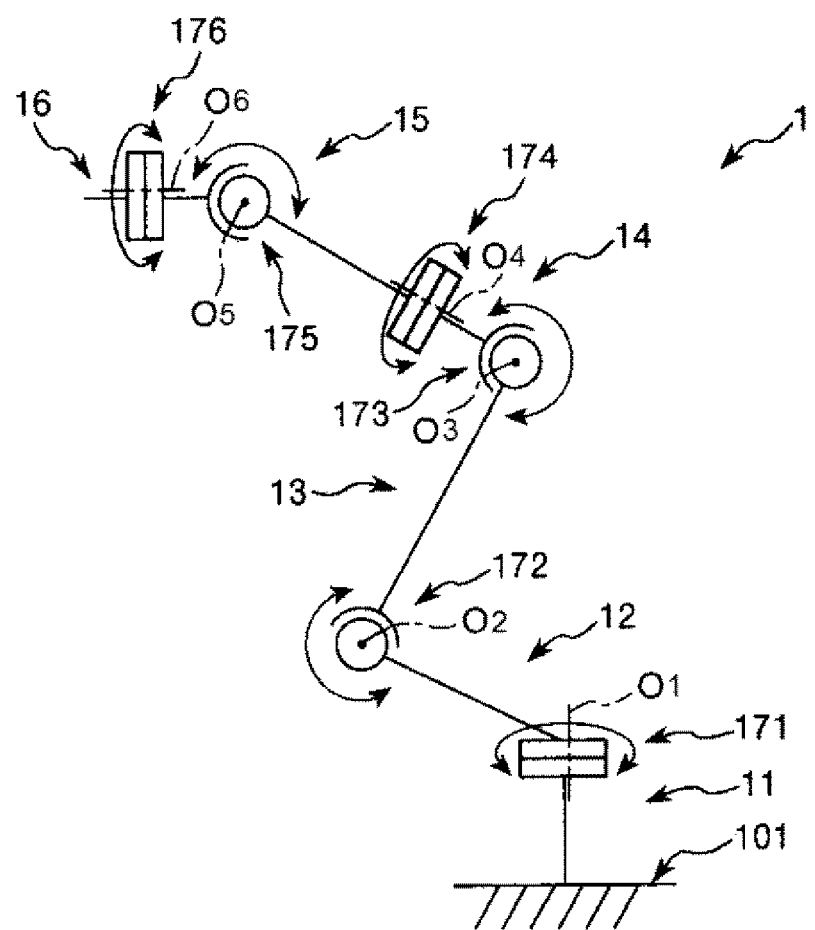
FIG. 3 is a schematic view of the robot shown in FIG. 1.
Figure 4:
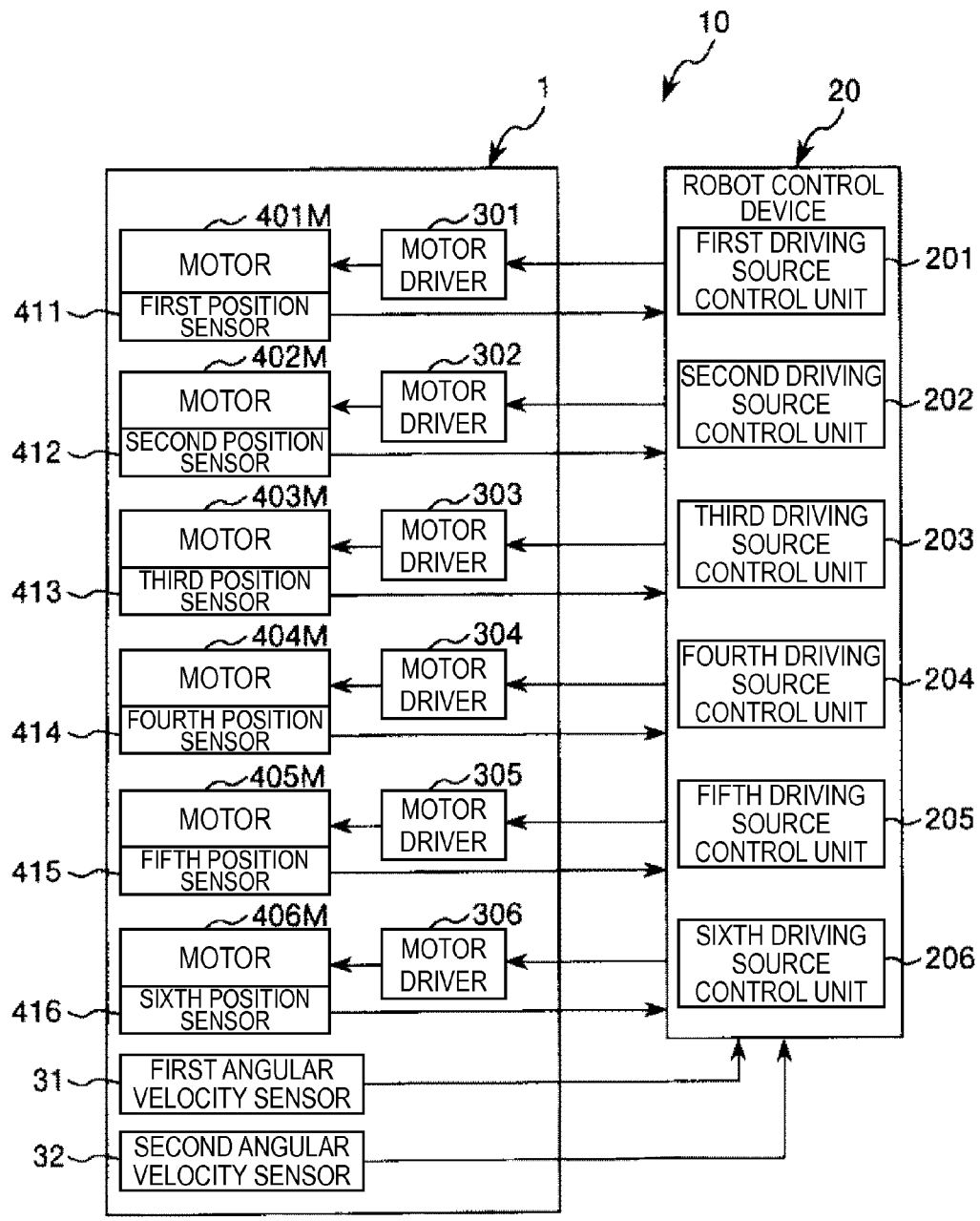
FIG. 4 is a block diagram of a part of a robot system having the robot shown in FIG. 1.
Figure 5:
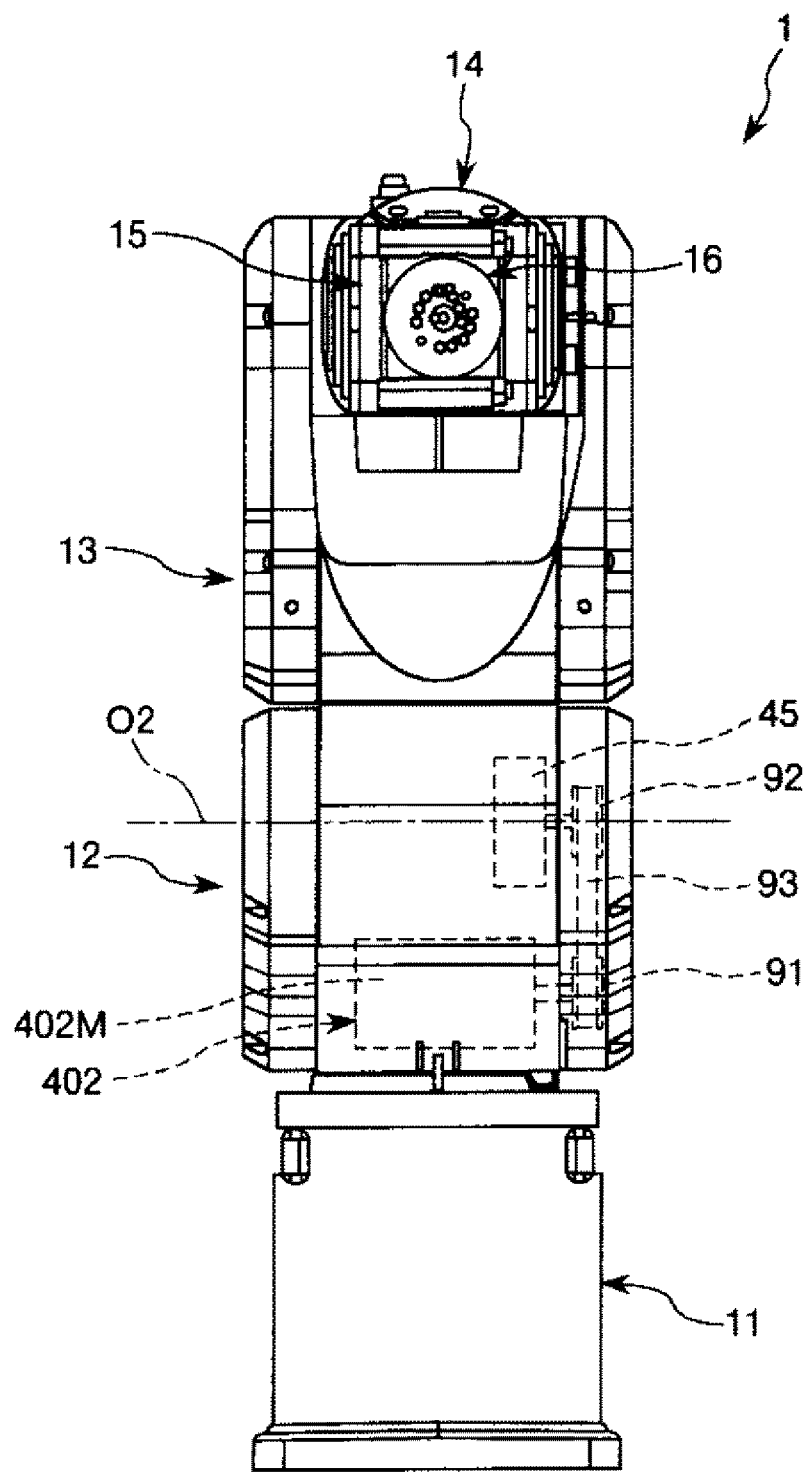
FIG. 5 is a front view of the robot shown in FIG. 1.
Figure 6:
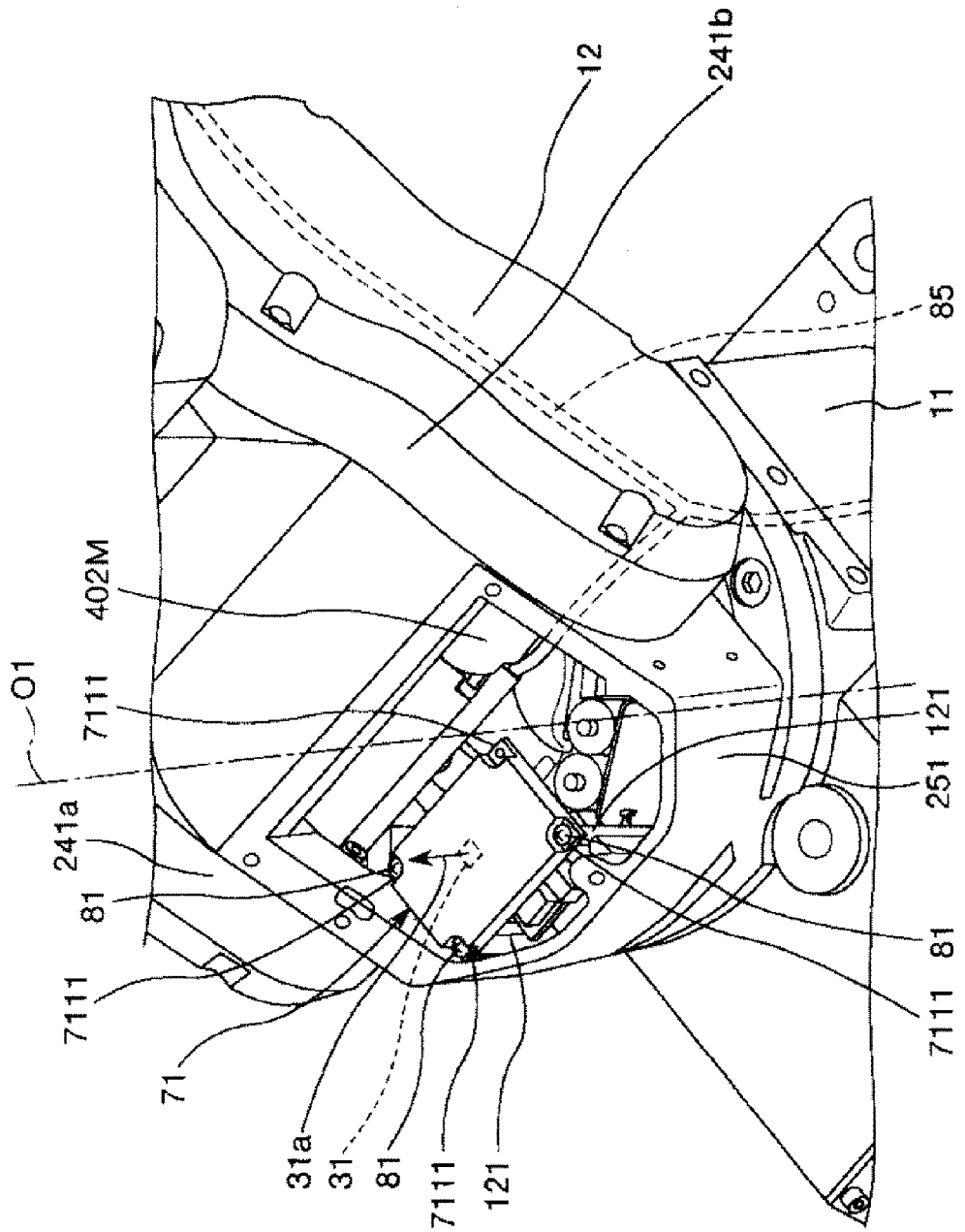
FIG. 6 is a diagram showing the vicinity of a first angular velocity sensor in a first arm of the robot shown in FIG. 1.
Figure 7:
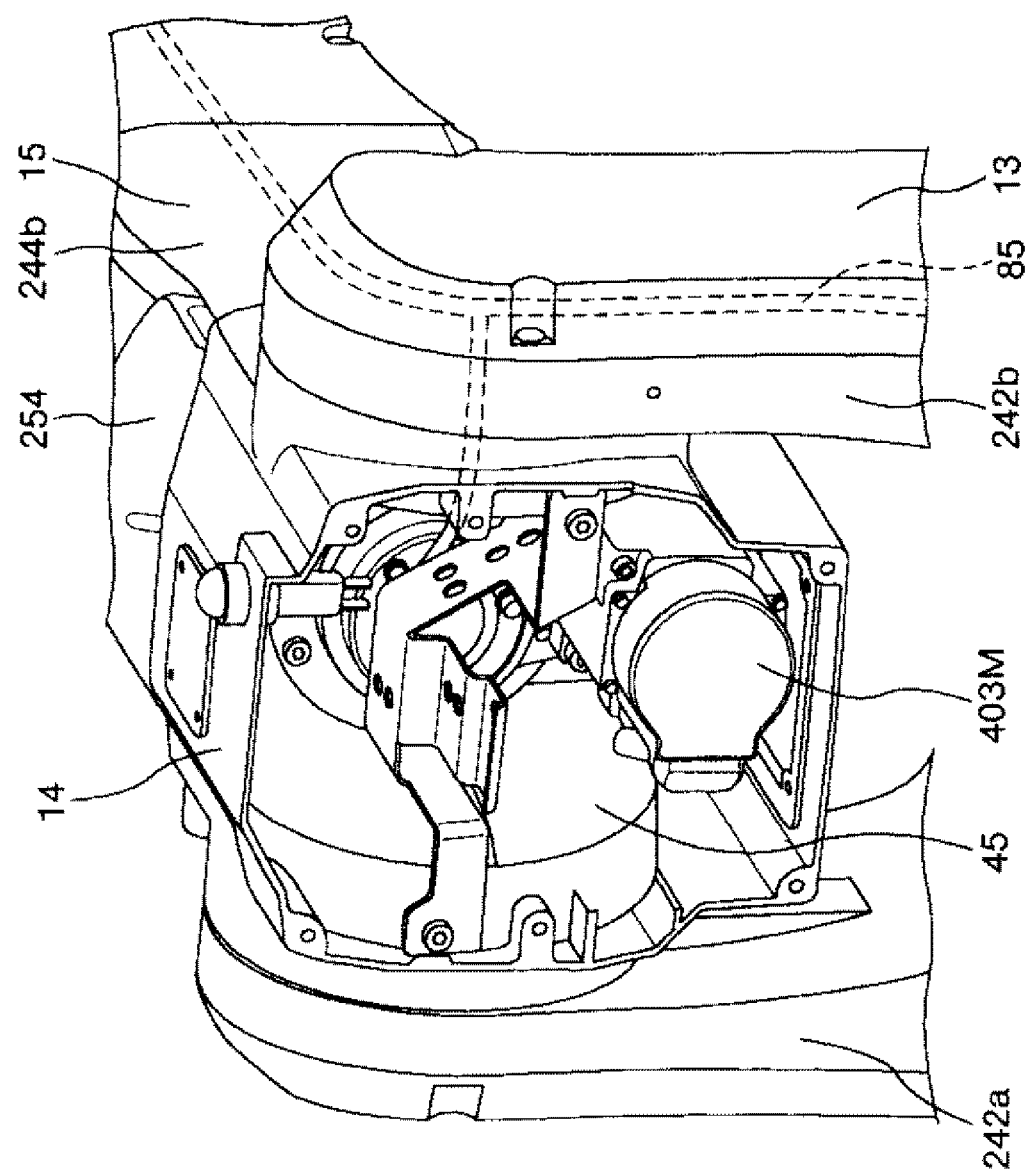
FIG. 7 is a diagram showing the vicinity of a speed reducer in a third arm of the robot shown in FIG. 1.
Figure 8:
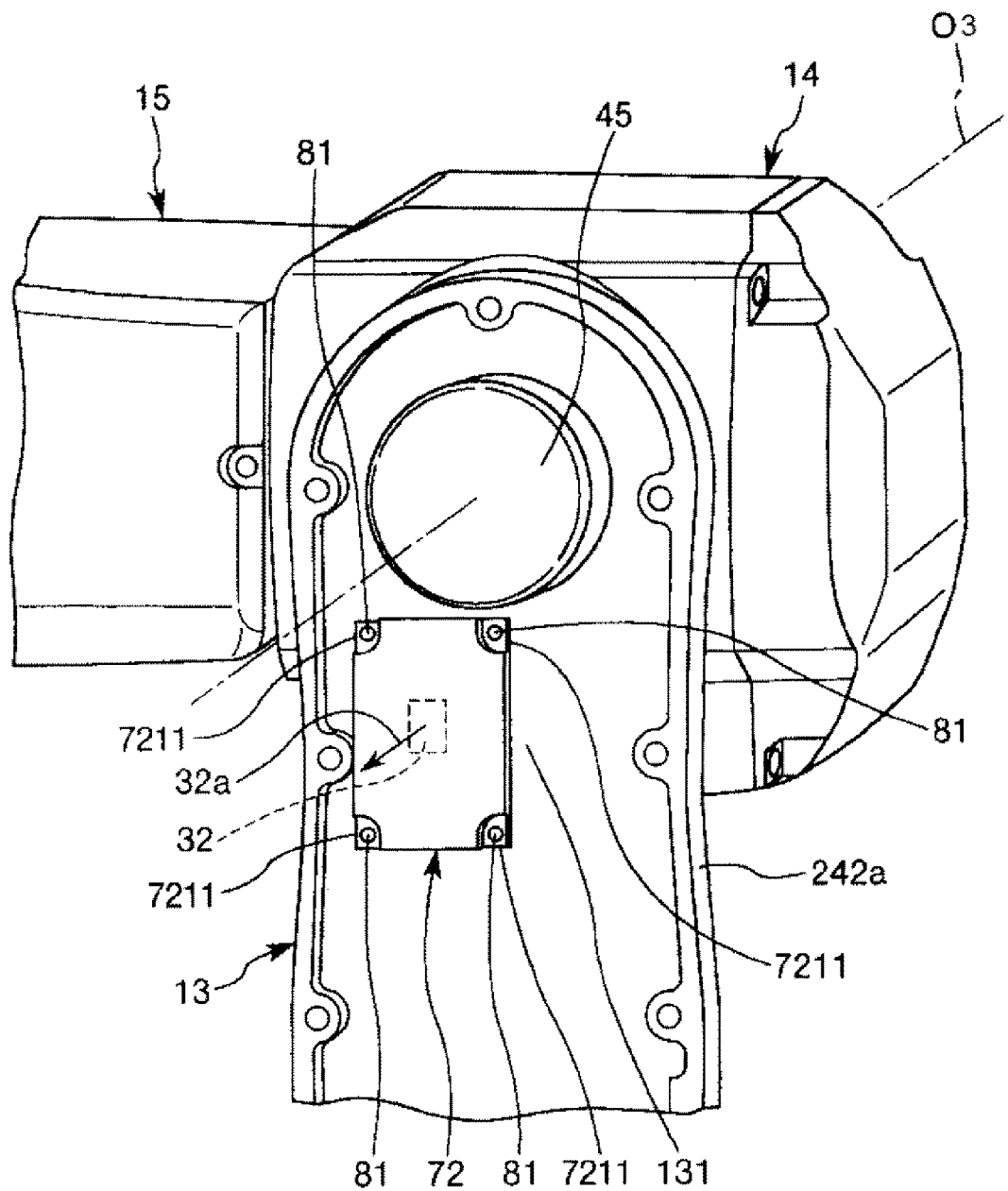
FIG. 8 is a diagram showing the vicinity of a second angular velocity sensor in a second arm of the robot shown in FIG. 1.
Figure 9:
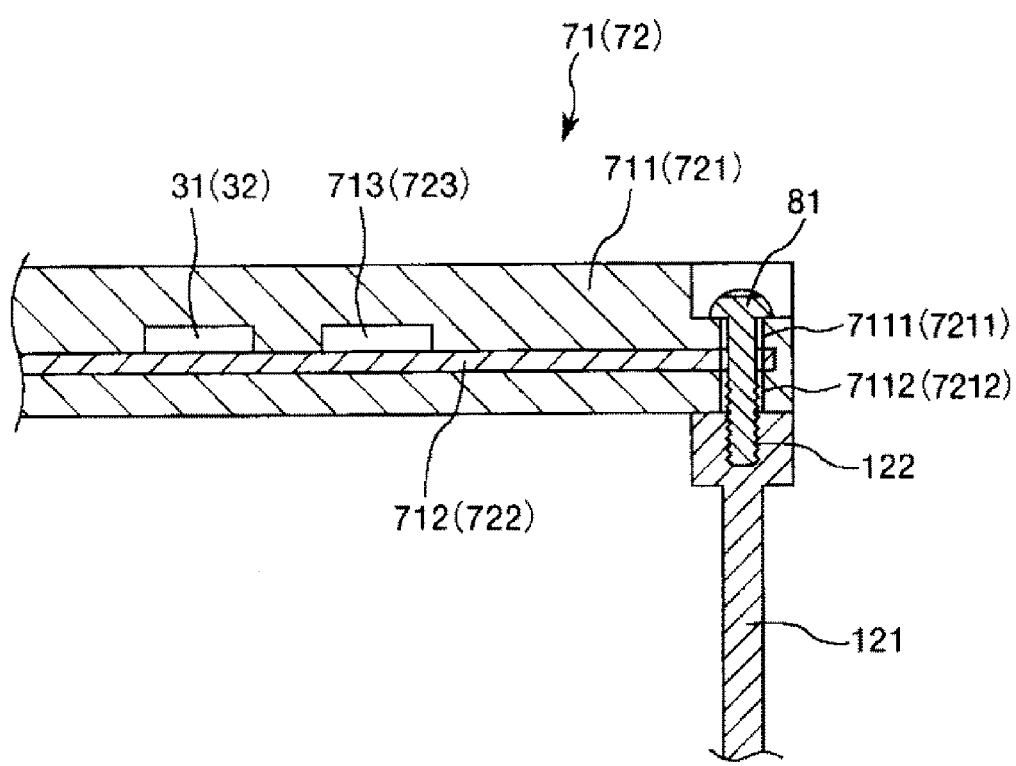
FIG. 9 is a sectional view of a first angular velocity sensor unit of the robot shown in FIG. 1.
Figure 10:
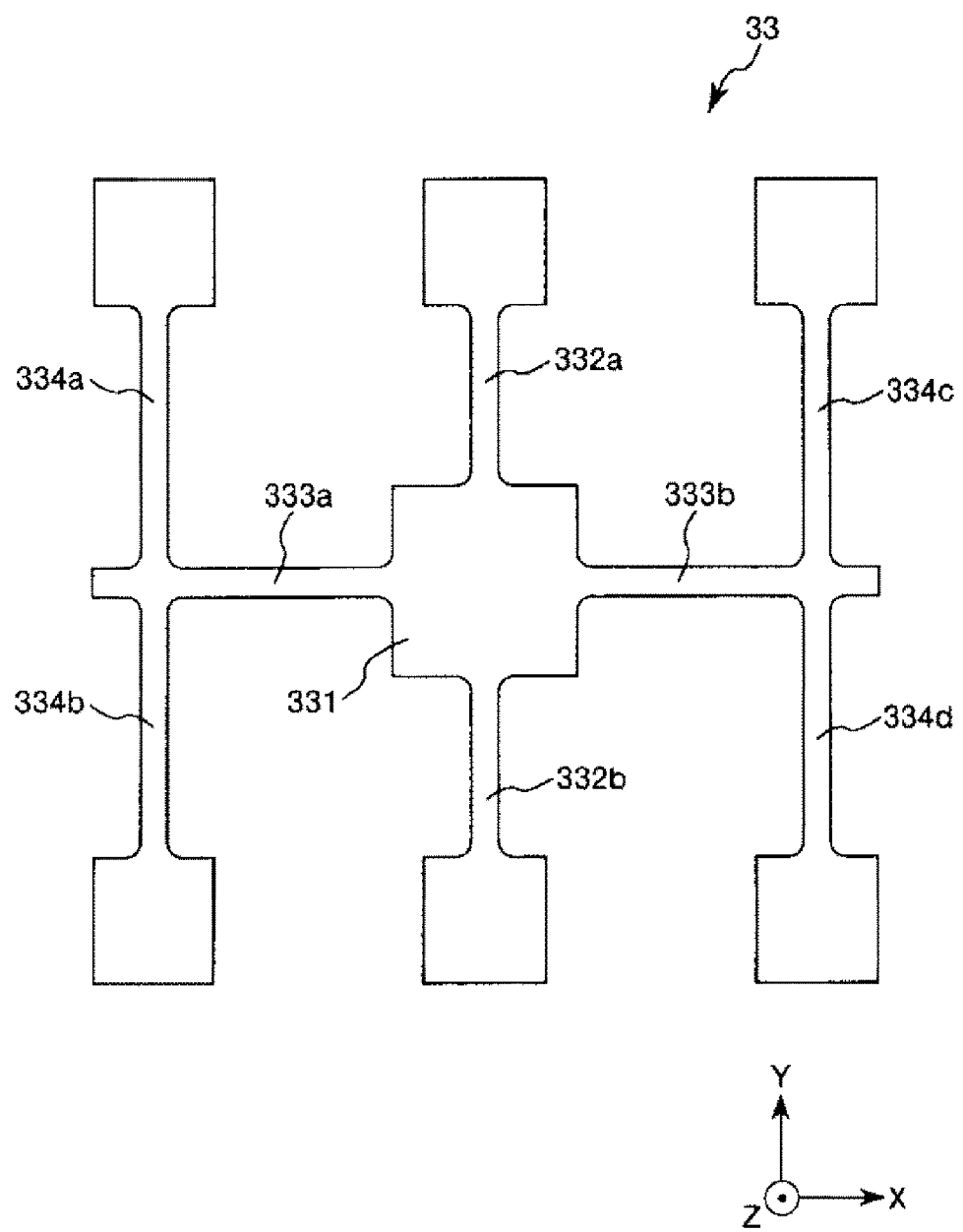
FIG. 10 is a plan view of a gyro element in an angular velocity sensor.
Figure 11A:
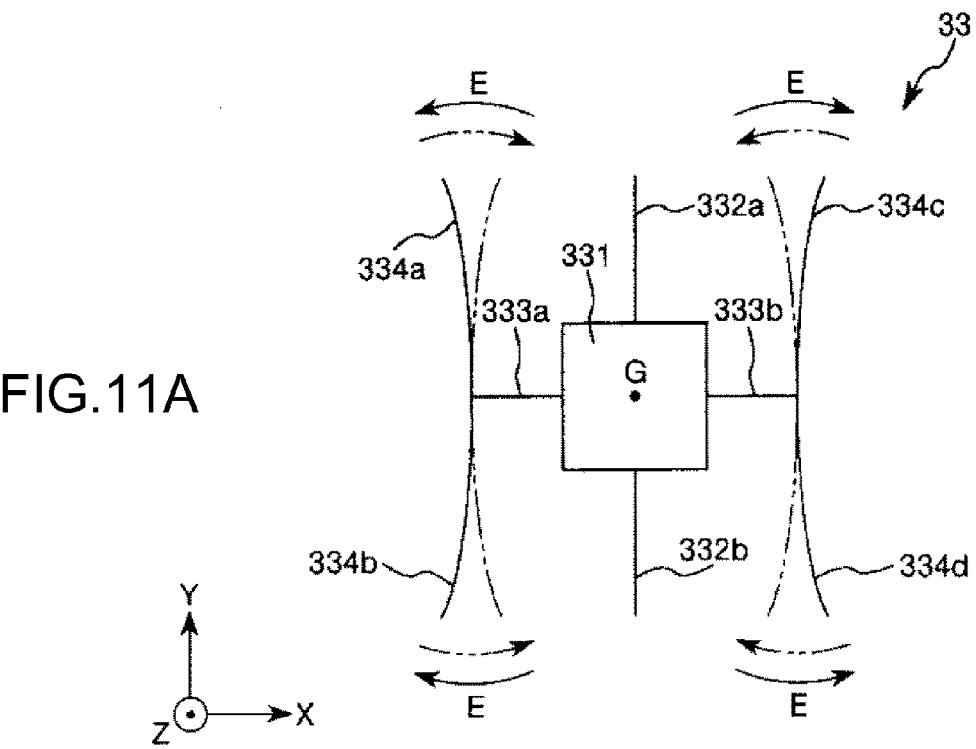
FIGS. 11A and 11B are diagrams showing the actuation of the gyro element shown in FIG. 10.
Figure 11B:
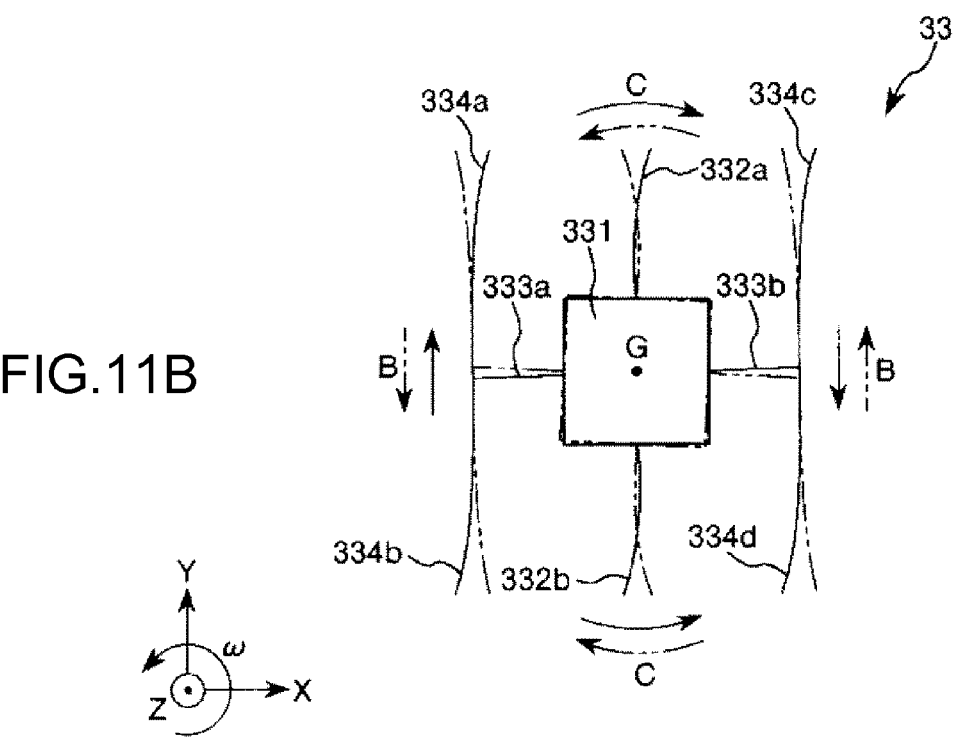

FIG. 1 is a perspective view when a robot according to an embodiment of the invention is viewed from a front side. FIG. 2 is a perspective view when the robot shown in FIG. 1 is viewed from a rear side. FIG. 3 is a schematic view of the robot shown in FIG. 1. FIG. 4 is a block diagram of a part of a robot system having the robot shown in FIG. 1. FIG. 5 is a front view of the robot shown in FIG. 1. FIG. 6 is a diagram showing the vicinity of a first angular velocity sensor in a first arm of the robot shown in FIG. 1. FIG. 7 is a diagram showing the vicinity of a speed reducer in a third arm of the robot shown in FIG. 1. FIG. 8 is a diagram showing the vicinity of a second angular velocity sensor in a second arm of the robot shown in FIG. 1. FIG. 9 is a sectional view of a first angular velocity sensor unit of the robot shown in FIG. 1. FIG. 10 is a plan view of a gyro element in an angular velocity sensor. FIGS. 11A and 11B are diagrams showing the actuation of the gyro element shown in FIG. 10. FIGS. 12 to 17 are block diagrams showing a part of the robot shown in FIG. 1.

Hereinafter, for convenience of description, the upper side in FIGS. 1 to 3 and 5 to 9 is referred to as "up" or "upward", and the lower side is referred to as "down" or "downward". The base side in FIGS. 1 to 3 and 5 to 8 is referred to as "base end", and the opposite side is referred to as "front end". In FIG. 9, reference numerals of the respective units of a second angular velocity sensor unit are written in parentheses corresponding to a first angular velocity sensor unit, and a diagram of the second angular velocity sensor unit is omitted.

A robot system (industrial robot system) 10 shown in FIGS. 1 to 4 can be used in, for example, a manufacturing process for manufacturing precision equipment, such as a wristwatch, and has a robot (industrial robot) 1, and a robot control device (control unit) 20 (see FIG. 4) which controls the actuation of the robot 1. The robot 1 and the robot control device 20 are electrically connected together. The robot control device 20 can be constituted by, for example, a personal computer (PC) embedded with a CPU (Central Processing Unit) or the like. The robot control device 20 will be described below in detail.

The robot 1 includes a base 11, four arms (links) 12, 13, 14, and 15, a wrist (link) 16, and six driving sources 401, 402, 403, 404, 405, and 406. The robot 1 is a vertical articulated (six-axis) robot (robot body) in which the base 11, the arms 12, 13, 14, and 15, and the wrist 16 are connected in this order from the base end to the front end. In the vertical articulated robot, the base 11, the arms 12 to 15, and the wrist 16 may be collectively referred to as "arm", the arm 12 may be referred to as a "first arm", the arm 13 may be referred to as a "second arm", the arm 14 may be referred to as a "third arm", the arm 15 may be referred to as a "fourth arm", and the wrist 16 may be referred to as "fifth arm and sixth arm", separately. In this embodiment, the wrist 16 has the fifth arm and the sixth arm. An end effector or the like can be attached to the wrist 16.

The arms 12 to 15 and the wrist 16 are supported to be separately displaceable with respect to the base 11. Although the length of each of the arms 12 to 15 and the wrist is not particularly limited, and in the illustrated configuration, the length of each of the first arm 12, the second arm 13, and the fourth arm 15 is set to be longer than the third arm 14 and the wrist 16.

The base 11 and the first arm 12 are connected together through a joint 171. The first arm 12 has a first rotating axis O1 parallel to a vertical direction as a rotation center with respect to the base 11, and is rotatable around the first rotating axis O1. The first rotating axis O1 matches (is aligned with) the normal to a top surface of a floor 101 which is an installation surface of the base 11. The rotation around the first rotating axis O1 is performed by driving of the first driving source 401 having a motor 401M. The first driving source 401 is driven by the motor 401M and a cable (not shown), and the motor 401M is controlled by the robot control device 20 through a motor driver 301 electrically connected to the motor 401M (see FIG. 4). Although the first driving source 401 may be configured to transmit a driving force from the motor 401M by a speed reducer (not shown) provided along with the motor 401M or a speed reducer may be omitted, in this embodiment, the first driving source 401 has a speed reducer.

The first arm 12 and the second arm 13 are connected together through a joint 172. The second arm 13 is rotatable around a second rotating axis O2 parallel to a horizontal direction as an axial center with respect to the first arm 12. The second rotating axis O2 is orthogonal to the first rotating axis O1. The rotation around the second rotating axis O2 is performed by driving of the second driving source 402 having a motor 402M. The second driving source 402 is driven by the motor 402M and a cable (not shown), and the motor 402M is controlled by the robot control device 20 through a motor driver 302 electrically connected to the motor 402M (see FIG. 4). Although the second driving source 402 may be configured to transmit a driving force from the motor 402M by a speed reducer 45 (see FIG. 5) provided along with the motor 402M or a speed reducer may be omitted, in this embodiment, the second driving source 402 has the speed reducer 45. The second rotating axis O2 may be parallel to an axis orthogonal to the first rotating axis O1.

The second arm 13 and the third arm 14 are connected together through a joint 173. The third arm 14 has a third rotating axis O3 parallel to the horizontal direction as a rotation center with respect to the second arm 13, and is rotatable around the third rotating axis O3. The third rotating axis O3 is parallel to the second rotating axis O2. The rotation around the third rotating axis O3 is performed by driving of the third driving source 403. The third driving source 403 is driven by a motor 403M and a cable (not shown), and the motor 403M is controlled by the robot control device 20 through a motor driver 303 electrically connected to the motor 403M (see FIG. 4). Although the third driving source 403 may be configured to transmit a driving force from the motor 403M by a speed reducer 45 (see FIG. 7) provided along with the motor 403M or a speed reducer may be omitted, in this embodiment, the third driving source 403 has the speed reducer 45.

The third arm 14 and the fourth arm 15 are connected together through a joint 174. The fourth arm 15 has a fourth rotating axis O4 parallel to a center axis direction of the third arm 14 as a rotation center with respect to the third arm 14 (base 11), and is rotatable around the fourth rotating axis O4. The fourth rotating axis O4 is orthogonal to the third rotating axis O3. The rotation around the fourth rotating axis O4 is performed by driving of the fourth driving source 404. The fourth driving source 404 is driven by a motor 404M and a cable (not shown), and the motor 404M is controlled by the robot control device 20 through a motor driver 304 electrically connected to the motor 404M (see FIG. 4). Although the fourth driving source 404 may be configured to transmit a driving force from the motor 404M by a speed reducer (not shown) provided along with the motor 404M or a speed reducer may be omitted, in this embodiment, the fourth driving source 404 has a speed reducer. The fourth rotating axis O4 may be parallel to an axis orthogonal to the third rotating axis O3.

The fourth arm 15 and the wrist 16 are connected together through a joint 175. The wrist 16 has a fifth rotating axis O5 parallel to the horizontal direction as a rotation center with respect to the fourth arm 15, and is rotatable around the fifth rotating axis O5. The fifth rotating axis O5 is orthogonal to the fourth rotating axis O4. The rotation around the fifth rotating axis O5 is performed by driving of the fifth driving source 405. The fifth driving source 405 is driven by a motor 405M and a cable (not shown), and the motor 405M is controlled by the robot control device 20 through a motor driver 305 electrically connected to the motor 405M (see FIG. 4). Although the fifth driving source 405 may be configured to transmit a driving force from the motor 405M by a speed reducer (not shown) provided along with the motor 405M or a speed reducer may be omitted, in this embodiment, the fifth driving source 405 has a speed reducer. The wrist 16 has a sixth rotating axis O6 perpendicular to the fifth rotating axis O5 as a rotation center through a joint 176, and is rotatable around the sixth rotating axis O6. The sixth rotating axis O6 is orthogonal to the fifth rotating axis O5. The rotation around the sixth rotating axis O6 is performed by driving of the sixth driving source 406. The sixth driving source 406 is driven by a motor 406M and a cable (not shown), and the motor 406M is controlled by the robot control device 20 through a motor driver 306 electrically connected to the motor 406M (see FIG. 4). Although the sixth driving source 406 may be configured to transmit a driving force from the motor 406M by a speed reducer (not shown) provided along with the motor 406M or a speed reducer may be omitted, in this embodiment, the sixth driving source 406 has a speed reducer. The fifth rotating axis O5 may be parallel to an axis orthogonal to the fourth rotating axis O4, and the sixth rotating axis O6 may be parallel to an axis orthogonal to the fifth rotating axis O5.

As shown in FIG. 6, the first arm 12 is provided with a first angular velocity sensor 31, that is, a first angular velocity sensor unit 71 having the first angular velocity sensor 31. The angular velocity around the first rotating axis O1 of the first arm 12 is detected by the first angular velocity sensor 31.

As shown in FIG. 8, the second arm 13 is provided with a second angular velocity sensor 32, that is, a second angular velocity sensor unit 72 having the second angular velocity sensor 32. The angular velocity around the second rotating axis O2 of the second arm 13 is detected by the second angular velocity sensor 32.

In the robot 1, vibration of the first arm 12, the second arm 13, and the third arm 14 is suppressed, thereby suppressing vibration of the entire robot 1. However, in order to suppress vibration of the first arm 12, the second arm 13, and the third arm 14, instead of providing the angular velocity sensor in each of the first arm 12, the second arm 13, and the third arm 14, as described above, the first angular velocity sensor 31 and the second angular velocity sensor 32 are respectively provided only in the first arm 12 and the second arm 13, and the actuation of the driving sources 401 and 402 is controlled by the detection results of the first angular velocity sensor 31 and the second angular velocity sensor 32. Accordingly, it is possible to reduce the number of angular velocity sensors, to reduce cost, and to simplify the circuit configuration compared to a case where the angular velocity sensor is provided in each of the first arm 12, the second arm 13, and the third arm 14. Since the angular velocity of the second arm 13 including the vibrational component of the angular velocity of the third arm 14 is detected by the second angular velocity sensor 32, it is possible to more reliably suppress vibration. The actuation of the second driving source 402 which rotates the second arm 13 on the base end side from the third arm 14 is controlled, whereby it is possible to increase the effect of suppressing vibration of the robot 1.

In the driving sources 401 to 406, a first position sensor 411, a second position sensor 412, a third position sensor 413, a fourth position sensor 414, a fifth position sensor 415, and a sixth position sensor 416 are respectively provided in the motors or the speed reducers. These position sensors are not particularly limited, and for example, an encoder, a rotary encoder, a resolver, a potentiometer, or the like may be used. The rotation angles of the shaft portions of the motors or the speed reducers of the driving sources 401 to 406 are detected by the position sensors 411 to 416. The motors of the driving sources 401 to 406 are not particularly limited, and for example, a servomotor, such as an AC servomotor or a DC servomotor, is preferably used. The respective cables may be inserted into the robot 1.

As shown in FIG. 4, the robot 1 is electrically connected to the robot control device 20. That is, the driving sources 401 to 406, the position sensors 411 to 416, and the angular velocity sensors 31 and 32 are electrically connected to the robot control device 20.

The robot control device 20 can actuate the arms 12 to 15 and the wrist 16 separately, that is, can control the driving sources 401 to 406 through the motor drivers 301 to 306 separately. In this case, the robot control device 20 performs detection by the position sensors 411 to 416, the first angular velocity sensor 31, and the second angular velocity sensor 32, and controls the driving of the driving sources 401 to 406, for example, the angular velocity, the rotation angle, or the like on the basis of the detection results. A control program is stored in a recording medium embedded in the robot control device 20 in advance.

As shown in FIGS. 1 and 2, if the robot 1 is a vertical articulated robot, the base 11 is a portion which is located on the lowermost side of the vertical articulated robot and is fixed to the floor 101 of the installation space. A fixing method is not particularly limited, and for example, in this embodiment shown in FIGS. 1 and 2, a fixing method by a plurality of bolts 111 is used. A fixing location of the base 11 in the installation space may be a wall or a ceiling of the installation space, instead of the floor.

The base 11 has a hollow base body (housing) 112. The base body 112 can be divided into a cylindrical portion 113 having a cylindrical shape, and a boxlike portion 114 having a boxlike shape which is formed integrally in the outer circumferential portion of the cylindrical portion 113. In the base body 112, for example, the motor 401M or the motor drivers 301 to 306 are stored.

Each of the arms 12 to 15 has a hollow arm body (housing) 2, a driving mechanism 3, and a sealing unit 4. Hereinafter, for convenience of description, the arm body 2, the driving mechanism 3, and the sealing unit 4 of the first arm 12 are respectively referred to as "arm body 2a", "driving mechanism 3a", and "sealing unit 4a", the arm body 2, the driving mechanism 3, and the sealing unit 4 of the second arm 13 are respectively referred to as "arm body 2b", "driving mechanism 3b", and "sealing unit 4b", the arm body 2, the driving mechanism 3, and the sealing unit 4 of the third arm 14 are respectively referred to as "arm body 2c", "driving mechanism 3c", and "sealing unit 4c", and the arm body 2, the driving mechanism 3, and the sealing unit 4 of the fourth arm 15 are respectively referred to as "arm body 2d", "driving mechanism 3d", and "sealing unit 4d".

Each of the joints 171 to 176 has a rotation support mechanism (not shown). The rotation support mechanism is a mechanism which rotatably supports one of two arms connected together with respect to the other arm, a mechanism which rotatably supports one of the base 11 and the first arm 12 connected together with respect to the other, or a mechanism which rotatably supports one of the fourth arm 15 and the wrist 16 connected together with respect to the other. In an example of the fourth arm 15 and the wrist 16 connected together, the rotation support mechanism can rotate the wrist 16 with respect to the fourth arm 15. Each rotation support mechanism has a speed reducer (not shown) which reduces the rotation speed of the corresponding motor at a predetermined reduction ratio, and transmits the driving force to the corresponding arm, a wrist body 161 of the wrist 16, and a support ring 162. As described above, in this embodiment, the speed reducer and the motor are referred to as a driving source.

The first arm 12 is connected to the upper end portion (front end portion) of the base 11 in a posture inclined with respect to the horizontal direction. In the first arm 12, the driving mechanism 3a has the motor 402M and is stored in the arm body 2a. The arm body 2a is sealed airtight by the sealing unit 4a. The arm body 2a has a pair of tongue piece portions 241a and 241b on the front end side, and a root portion 251 on the base end side. The tongue piece portion 241a and the tongue piece portion 241b are separated from each other and opposite to each other. The tongue piece portions 241a and 241b are inclined with respect to the root portion 251, and thus, the first arm 12 is inclined with respect to the horizontal direction. A base end portion of the second arm 13 is arranged between the tongue piece portion 241a and the tongue piece portion 241b.

The installation position of the first angular velocity sensor 31 in the first arm 12 is not particularly limited, and in this embodiment, as shown in FIG. 6, the first angular velocity sensor 31, that is, the first angular velocity sensor unit 71 is provided in an end portion of the root portion 251 of the arm body 2a of the first arm 12 on an opposite side to an internal cable 85. The cable 85 is a cable which supplies power to the motors 401M to 406M of the robot 1. Accordingly, it is possible to prevent the first angular velocity sensor 31 from being affected by noise from the cable 85, and to prevent a below-described circuit unit 713, a wiring, and the first angular velocity sensor 31 of the first angular velocity sensor unit 71 from being short-circuited by the cable 85.

Here, for the driving mechanism 3 and the speed reducer, representatively, the driving mechanism 3 which is provided in the arm body 2a of the first arm 12 and rotates the second arm 13 will be described.

As shown in FIG. 5, the driving mechanism 3 has a first pulley 91 which is connected to the shaft portion of the motor 402M, a second pulley 92 which is arranged to be separated from the first pulley 91, and a belt (timing belt) 93 which is stretched between the first pulley 91 and the second pulley 92. The second pulley 92 and the shaft portion of the second arm 13 are connected together by the speed reducer 45.

The speed reducer 45 is not particularly limited, and for example, a so-called "planetary gear-type" speed reducer having a plurality of gears, a harmonic drive ("harmonic drive" is a registered trademark), or the like may be used.

A main cause for vibration of the arms 12 to 15 and the wrist 16 of the robot 1 is, for example, distortion or deflection of the speed reducer 45, expansion and contraction of the belt 93, deflection of the arms 12 to 15 and the wrist 16, or the like. Here, as described above, the configuration of the speed reducer 45 is not particularly limited, and of various configurations, a "planetary gear-type" speed reducer is preferably used. In general, the speed reducer having this configuration can secure high rigidity compared to speed reducers having other configurations, such as a harmonic drive. Accordingly, it is possible to reduce distortion or deflection of the speed reducer 45 and to suppress vibration of the arms 12 to 15 and the wrist 16 of the robot 1 by the same amount. Hereinafter, a case where a "planetary gear-type" speed reducer is used as the speed reducer 45 will be described.

The second arm 13 is connected to a front end portion of the first arm 12. In the second arm 13, the driving mechanism 3b has the motor 403M and is stored in the arm body 2b. The arm body 2a is sealed airtight by the sealing unit 4b. The arm body 2b has a pair of tongue piece portions 242a and 242b on the front end side, and a root portion 252 on the base end side. The tongue piece portion 242a and the tongue piece portion 242b are separated from each other and opposite to each other. A base end portion of the third arm 14 is arranged between the tongue piece portion 242a and the tongue piece portion 242b.

The installation position of the second angular velocity sensor 32 in the second arm 13 is not particularly limited, and in this embodiment, as shown in FIG. 8, the second angular velocity sensor 32 is provided in an end portion of the arm body 2c of the second arm 13 on an opposite side to the internal cable 85. In other words, the second angular velocity sensor unit 72 is arranged in the tongue piece portion 242a separated from the tongue piece portion 242b, through which the cable 85 passes. Accordingly, it is possible to prevent the second angular velocity sensor 32 from being affected by noise from the cable 85, and to prevent a circuit unit 723, a wiring, and the second angular velocity sensor 32 of the second angular velocity sensor unit 72 from being short-circuited by the cable 85.

It is preferable that the second angular velocity sensor 32 is located on the front end side of the second arm 13. In other words, it is preferable that the second angular velocity sensor 32 (second angular velocity sensor unit 72) is arranged such that the distance from the third rotating axis O3 is shorter than the distance from the second rotating axis O2. With this, the second angular velocity sensor 32 can be arranged at a position close to the third arm 14. For this reason, as described below, the vibrational component of the third arm 14 transmitted to the second arm 13 through the speed reducer 45 can be detected by the second angular velocity sensor more efficiently (before attenuation increases). Accordingly, it is possible to increase the effect of suppressing vibration of the robot 1.

The third arm 14 is connected to a front end portion of the second arm 13. In the third arm 14, the driving mechanism 3c has the motor 404M and is stored in the arm body 2c. The arm body 2c is sealed airtight by the sealing unit 4c. The arm body 2c is constituted by a member corresponding to the root portion 251 of the arm body 2a and the root portion 252 of the arm body 2b.

The above-described speed reducer 45 is provided on the third rotating axis O3 in the third arm 14, and the third arm 14 is connected to the second arm 13 through the speed reducer 45. Since a "planetary gear-type" speed reducer having high rigidity is used as the speed reducer 45, the vibrational component (the vibrational component of the angular velocity around the third rotating axis O3; the same applies to the following description) of the third arm 14 is easily transmitted to the second arm 13 through the speed reducer 45. For this reason, the angular velocity of the second arm 13 including the vibrational component of the third arm 14 can be detected by the second angular velocity sensor 32 provided in the second arm 13, and to increase the effect of suppressing vibration of the robot 1.

Here, in order to detect the angular velocity of the third arm 14, it is considered that the same angular velocity sensor unit (angular velocity sensor) as the first and second angular velocity sensor units 71 and 72 is provided in the third arm 14. However, in this case, it is desirable to secure a space for arranging the angular velocity sensor unit in the third arm 14, causing an increase in size (increase in weight) of the third arm 14 by the same amount. Since the third arm 14 is located on the front end side of the robot 1, the ratio of an increase in vibration with respect to the increase in weight is larger than other portions (first and second arms 12 and 13). Accordingly, if an angular velocity sensor unit is also arranged in the third arm 14, vibration increases in the robot 1.

If an angular velocity sensor unit is arranged in the third arm 14, for example, it is desirable to extract a cable, which is connected to the angular velocity sensor unit, to the second arm 13 through the speed reducer 45. If a cavity through which the cable passes is formed in the speed reducer 45, rigidity of the speed reducer 45 is degraded by the same amount, and in order to prevent degradation of rigidity, an increase in size (increase in weight) of the speed reducer 45 occurs. If rigidity of the speed reducer 45 is degraded, vibration of the robot 1 increases, and vibration of the third arm 14 is less likely to be transmitted to the second arm 13. If the speed reducer 45 increases in weight, vibration increases in the robot 1.

In this way, if an angular velocity sensor unit is arranged in the third arm 14, vibration of the robot excessively increases, making it difficult to perform control for suppressing vibration. Accordingly, in the robot 1, an angular velocity sensor unit is not arranged in the third arm 14, and alternatively, the vibrational component of the third arm 14 is detected by the second angular velocity sensor unit 72 arranged in the second arm 13. With this, an increase in vibration of the robot 1 due to degradation of rigidity of the speed reducer 45 or an increase in weight of the third arm 14 is prevented, and vibration of the third arm 14 is easily transmitted to the second arm 13 through the speed reducer 45. For this reason, it is possible to effectively suppress vibration of the robot 1 under control described below.

The fourth arm 15 is connected to a front end portion of the third arm 14 in parallel with the center axis direction. In the fourth arm 15, the driving mechanism 3*d* has the motors 405M and 406M and is stored in the arm body 2*d*. The arm body 2*d* is sealed airtight by the sealing unit 4*d*. The arm body 2*d* has a pair of tongue piece portions 244*a* and 244*b* on the front end side, and a root portion 254 on the base end side. The tongue piece portion 244*a* and the tongue piece portion 244*b* are separated from each other and opposite to each other. The support ring 162 of the wrist 16 is arranged between the tongue piece portion 244*a* and the tongue piece portion 244*b*.

The wrist 16 is connected to a front end portion (an end portion on an opposite side to the base 11) of the fourth arm 15. In the wrist 16, for example, a manipulator (not shown) which holds precision equipment, such as a wristwatch, is detachably mounted as a functional unit (end effector) in the front end portion (the end portion on an opposite side to the fourth arm 15). The manipulator is not particularly limited, and for example, a configuration in which a plurality of finger portions are provided may be used. The robot 1 controls the operations of the arms 12 to 15, the wrist 16, and the like while holding the precision equipment with the manipulator, thereby conveying the precision equipment.

The wrist 16 has a cylindrical wrist body (sixth arm) 161, and a ring-shaped support ring (fifth arm) 162 which is constituted separately from the wrist body 161 and is provided in the base end portion of the wrist body 161.

A front end surface 163 of the wrist body 161 is a flat surface, and becomes a mounting surface on which the manipulator is mounted. The wrist body 161 is connected to the driving mechanism 3*d* of the fourth arm 15 through the joint 176, and rotates around the sixth rotating axis O6 by driving of the motor 406M of the driving mechanism 3*d*.

The support ring 162 is connected to the driving mechanism 3*d* of the fourth arm 15 through the joint 175, and rotates around the fifth rotating axis O5 along with the wrist body 161 by driving of the motor 405M of the driving mechanism 3*d*.

A constituent material of the arm body 2 is not particularly limited, and for example, various metal materials may be used and of these, aluminum or an aluminum alloy is particularly preferably used. If the arm body 2 is a casting which is molded using a mold, aluminum or an aluminum alloy is used as the constituent material of the arm body 2, whereby it is possible to easily perform metallic molding.

A constituent material of each of the base body 112 of the base 11, the wrist body 161 of the wrist 16, and the support ring 162 is not particularly limited, and for example, the same material as the constituent material of the arm body 2 may be used. As a constituent material of the wrist body 161 of the wrist 16, stainless steel is preferably used.

A constituent material of the sealing unit 4 is not particularly limited, and for example, various resin materials and various metal materials may be used. A resin material is used as the constituent material of the sealing unit 4, whereby it is possible to achieve reduction in weight.

Next, the first angular velocity sensor unit 71 and the second angular velocity sensor unit 72 will be described.

As shown in FIG. 9, the first angular velocity sensor unit 71 has a first housing 711, and a circuit board 712 having a wiring and a first angular velocity sensor 31 and a circuit unit 713 electrically connected onto the circuit board 712, which are provided in the first housing 711. In this embodiment, the first housing 711 is made of a sealing material, and the first angular velocity sensor 31, the circuit unit 713, and the circuit board 712 are collectively sealed by the sealing material.

Similarly, the second angular velocity sensor unit 72 has a second housing 721, and a circuit board 722 having a wiring and a second angular velocity sensor 32 and a circuit unit 723 electrically connected onto the circuit board 722, which are provided in the second housing 721. In this embodiment, the second housing 721 is made of a sealing material, and the second angular velocity sensor 32, the circuit unit 723, and the circuit board 722 are collectively sealed by the sealing material.

In this way, the first angular velocity sensor 31, the circuit unit 713, the second angular velocity sensor 32, and the circuit unit 723 are packaged, thereby simplifying the configuration. Since the first angular velocity sensor unit 71 and the second angular velocity sensor unit 72 have the same configuration, hereinafter, the first angular velocity sensor unit 71 will be representatively described, and description of the second angular velocity sensor unit 72 will be omitted.

The first angular velocity sensor 31 has a gyro element 33 which includes one detection axis. The configuration of the gyro element 33 is not particularly limited, and for example, the following gyro element may be used. Hereinafter, as shown in FIGS. 10, 11A, and 11B, the axes orthogonal to each other are defined as an X axis (second axis), a Y axis (first axis), and a Z axis.

As shown in FIG. 10, the gyro element 33 has a quartz substrate having a base portion 331, a pair of detection vibrating arms 332*a* and 332*b* which extend from both sides of the base portion 331 in the Y-axis direction and in opposite directions, a pair of connecting arms 333*a* and 333*b* which extend from both sides of the base portion 331 in the X-axis direction and in opposite directions, a pair of driving vibrating arms 334*a* and 334*b* which extend from both sides of a front end portion of the connecting arm 333*a* in the Y-axis direction and in opposite directions, and a pair of driving vibrating arms 334*c* and 334*d* which extend from both sides of a front end portion of the connecting arm 333*b* in the Y-axis direction and in opposite directions, detection electrodes (not shown) which are provided in the respective detection vibrating arms 332*a* and 332*b*, and driving electrodes (not shown) which are provided in the respective driving vibrating arms 334*a*, 334*b*, 334*c*, and 334*d*.

The gyro element 33 is actuated as follows. In FIGS. 11A and 11B, the respective vibrating arms are represented by lines so as to easily express a vibration form.

First, as shown in FIG. 11A, in a state where the angular velocity is not applied to the gyro element 33, a voltage is applied to the driving electrodes to cause bending vibration of the respective driving vibrating arms 334a, 334b, 334c, and 334d in a direction indicated by arrow E. In the bending vibration, a vibration mode indicated by a solid line and a vibration mode indicated by a two-dot-chain line are repeated at a predetermined frequency. At this time, the driving vibrating arms 334a and 334b and the driving vibrating arms 334c and 334d vibrate line-symmetrically with respect to the Y axis passing through the center of gravity G.

As shown in FIG. 11B, in a state where the vibration is performed, if an angular velocity ω around the Z axis (detection axis) is applied to the gyro element 33, a Coriolis force in a direction of arrow B acts on the driving vibrating arms 334a, 334b, 334c, and 334d and the connecting arms 333a and 333b, and renewed vibration is excited in these arms. Simultaneously, vibration in a direction of arrow C in response to vibration indicated by arrow B is excited in the detection vibrating arms 332a and 332b. A signal (voltage) according to strain of the detection vibrating arms 332a and 332b caused by vibration of the detection vibrating arms 332a and 332b is output from the detection electrodes.

In the above, the gyro element 33 has been simply described.

The circuit unit 713 has an AD conversion unit which performs AD conversion on the signal output from the first angular velocity sensor 31, that is, converts an analog signal to a digital signal, and a transmitting unit which transmits the converted signal to the robot control device 20.

The appearance of the first housing 711 is a cube. The detection axis of the first angular velocity sensor 31 matches (is aligned with) the normal to the largest surface of the rectangular parallelepiped of the first housing 711. With this, it is possible to recognize the directions of the detection axis of the first angular velocity sensor 31 and the detection axis of the second angular velocity sensor 32 easily and reliably, and to allow the first angular velocity sensor and the second angular velocity sensor 32 to take an appropriate posture easily. In particular, as described above, since the gyro element 33 has a flat shape, and the normal to the plate surface is defined as the detection axis, it becomes easy to allow the detection axis of the first angular velocity sensor 31 to match the normal to the largest surface of the rectangular parallelepiped of the first housing 711. As shown in FIG. 6, the first angular velocity sensor unit 71 is provided such that a detection axis 31a of the first angular velocity sensor 31 is parallel to the first rotating axis O1. As shown in FIG. 8, the second angular velocity sensor unit 72 is provided such that a detection axis 32a of the second angular velocity sensor 32 is parallel to the second rotating axis O2 and the third rotating axis O3.

As shown in FIGS. 6 and 9, the first housing 711 has attachment portions 7111 to be attached to the first arm 12 in four corner portions. In each attachment portion 7111, a hole 7112 into which a screw (fixing member) 81 is inserted is formed.

The first arm 12 has three arm-side attachment portions 121 which are formed integrally with the arm body 2a and to which the first angular velocity sensor unit 71 (first housing 711) is attached. Each arm-side attachment portion 121 is constituted by a fulcrum which is formed to protrude toward the arm body 2a. The respective arm-side attachment portions 121 are arranged at positions corresponding to the attachment portions 7111 of the first housing 711. In the front end portion of each arm-side attachment portion 121, a threaded bore 122 into which the screw 81 is threaded is formed.

The term "integrally" in the arm-side attachment portions 121 formed integrally with the arm body 2a refers to a case where the arm body 2a and the arm-side attachment portions 121 are formed simultaneously by, for example, die-casting or the like, instead of forming members separately and bonding the members. The same applies to the term "integrally" in below-described arm-side attachment portions 131 formed integrally with the arm body 2b.

When attaching (providing) the first angular velocity sensor unit 71 to the first arm 12, three screws 81 are inserted into the holes 7112 of the first housing 711 and threaded into the threaded bores 122 in the front end portions of the arm-side attachment portions 121 of the first arm 12. With this, the three attachment portions 7111 of the first housing 711 are fixed to the arm-side attachment portions 121 of the first arm 12 by the screws 81. That is, the first angular velocity sensor unit 71 is attached to the arm-side attachment portions 121 of the first arm 12. In this case, there is nothing between the arm-side attachment portions 121 and the first angular velocity sensor unit 71, that is, the first angular velocity sensor unit 71 is directly attached to the arm-side attachment portions 121. With this, it is possible to attach the first angular velocity sensor unit 71 to the first arm 12 reliably, and to allow the first angular velocity sensor unit 71 to rotate integrally with the first arm 12 reliably.

The term "directly" when the first angular velocity sensor unit 71 is directly attached to the arm-side attachment portions 121 refers to a case excluding a case where the first angular velocity sensor unit 71 is attached to an intermediate, such as a separate substrate, and the intermediate is attached to the arm-side attachment portions 121. That is, the term "directly" refers to a case where there is nothing, excluding an adhesive or the like, between the arm-side attachment portions 121 and the first angular velocity sensor unit 71. The same applies to the term "directly" when the below-described second angular velocity sensor unit 72 is directly attached to arm-side attachment portions 131.

The screws 81 are conductive and are formed of, for example, various metal materials. If the screws 81 are inserted into the holes 7112 of the first housing 711 and are threaded into the threaded bores 122 in the front end portions of the arm-side attachment portions 121, the screws 81 are electrically connected to the wiring of the circuit board 712 electrically connected to a ground terminal of the circuit unit 713, and the front end portions of the screws 81 are electrically connected to the arm-side attachment portions 121. With this, the ground terminal of the circuit unit 713 is electrically connected to the arm body 2a of the first arm 12 through the wiring and the screws 81 and grounded. Accordingly, it is possible to reduce the number of components for grounding and to simplify the configuration.

As shown in FIGS. 8 and 9, the second housing 721 has attachment portions 7211 to be attached to the second arm 13 in four corner portions. In each attachment portion 7211, a hole 7212 into which the screw 81 is inserted is formed.

As shown in FIG. 8, the second arm 13 has the arm-side attachment portions 131 which are formed integrally with the arm body 2b and to which the second angular velocity sensor unit 72 (second housing 721) is attached. The arm-side attachment portions 131 are formed integrally with the arm body 2b. In each of the corner portions of the arm-side attachment portions 131, a threaded bore into which the screw 81 is threaded is formed.

When attaching the second angular velocity sensor unit 72 to the second arm 13, the four screws 81 are inserted into the holes 7212 of the second housing 721 and threaded into the threaded bores in the front end portions of the arm-side attachment portions 131 of the second arm 13. With this, the four attachment portions 7211 of the second housing 721 are fixed to the arm-side attachment portions 131 of the second arm 13 by the screws 81. That is, the second angular velocity sensor unit 72 is attached to the arm-side attachment portions 131 of the second arm 13. In this case, there is nothing between the arm-side attachment portions 131 and the second angular velocity sensor unit 72, that is, the second angular velocity sensor unit 72 is directly attached to the arm-side attachment portions 131. Accordingly, it is possible to attach the second angular velocity sensor unit 72 to the second arm 13 reliably, and to allow the second angular velocity sensor unit 72 to rotate integrally with the second arm 13 reliably.

If the screws 81 are inserted into the holes 7212 of the second housing 721 and threaded into the threaded bores of the arm-side attachment portions 131, the screws 81 are electrically connected to a wiring of the circuit board 722 electrically connected to a ground terminal of the circuit unit 723, and the front end portions of the screws 81 are electrically connected to the arm-side attachment portions 131. With this, the ground terminal of the circuit unit 723 is electrically connected to the arm body 2b of the second arm through the wiring and the screws 81 and grounded. Accordingly, it is possible to reduce the number of components for grounding and to simplify the configuration.

Next, the configuration of the robot control device 20 will be described referring to FIGS. 4 and 12 to 17.

The robot control device 20 has a receiving unit which receives a first signal output from the first angular velocity sensor 31, a second signal output from the second angular velocity sensor 32, and respective signals output from the position sensors 411 to 416, a calculation unit which obtains a vibrational component of the angular velocity of the first arm 12 and a vibrational component of the angular velocity of the second arm 13 on the basis of the first signal and the second signal received by the receiving unit, and a control unit which controls the actuation of the robot 1 on the basis of the vibrational component of the angular velocity of the first arm 12 and the vibrational component of the angular velocity of the second arm 13 obtained by the calculation unit.

Specifically, as shown in FIGS. 4 and 12 to 17, the robot control device 20 has the receiving unit, a first driving source control unit 201 which controls the actuation of the first driving source 401, a second driving source control unit 202 which controls the actuation of the second driving source 402, a third driving source control unit 203 which controls the actuation of the third driving source 403, a fourth driving source control unit 204 which controls the actuation of the fourth driving source 404, a fifth driving source control unit 205 which controls the actuation of the fifth driving source 405, and a sixth driving source control unit 206 which controls the actuation of the sixth driving source 406.

The calculation unit is constituted by a below-described angular velocity calculation unit 561 of the first driving source control unit 201, a subtracter 571, and a below-described angular velocity calculation unit 562 of the second driving source control unit 202.

Figure 12:
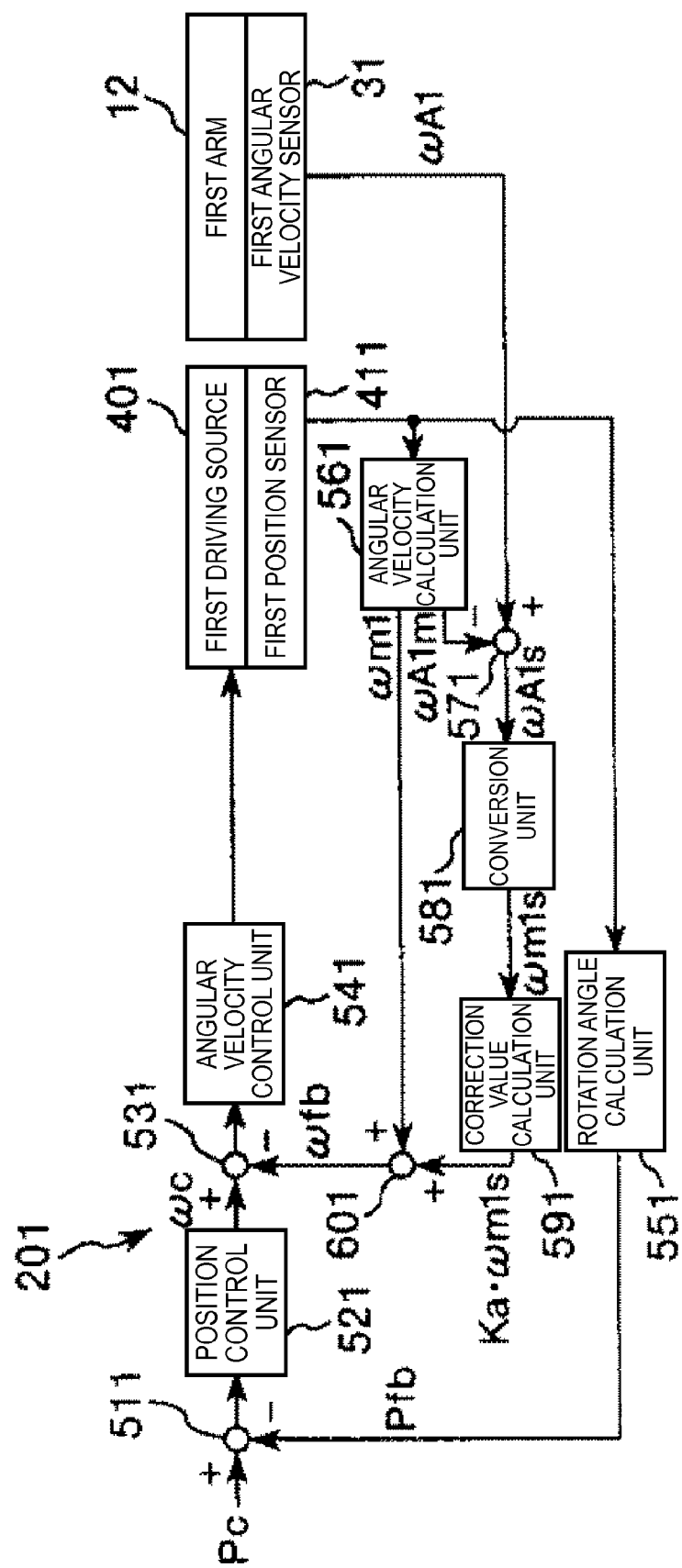
FIG. 12 is a block diagram of a part of the robot shown in FIG. 1.

As shown in FIG. 12, the first driving source control unit 201 has a subtracter 511, a position control unit 521, a subtracter 531, an angular velocity control unit 541, a rotation angle calculation unit 551, an angular velocity calculation unit 561, a subtracter 571, a conversion unit 581, a correction value calculation unit 591, and an adder 601.

Figure 13:
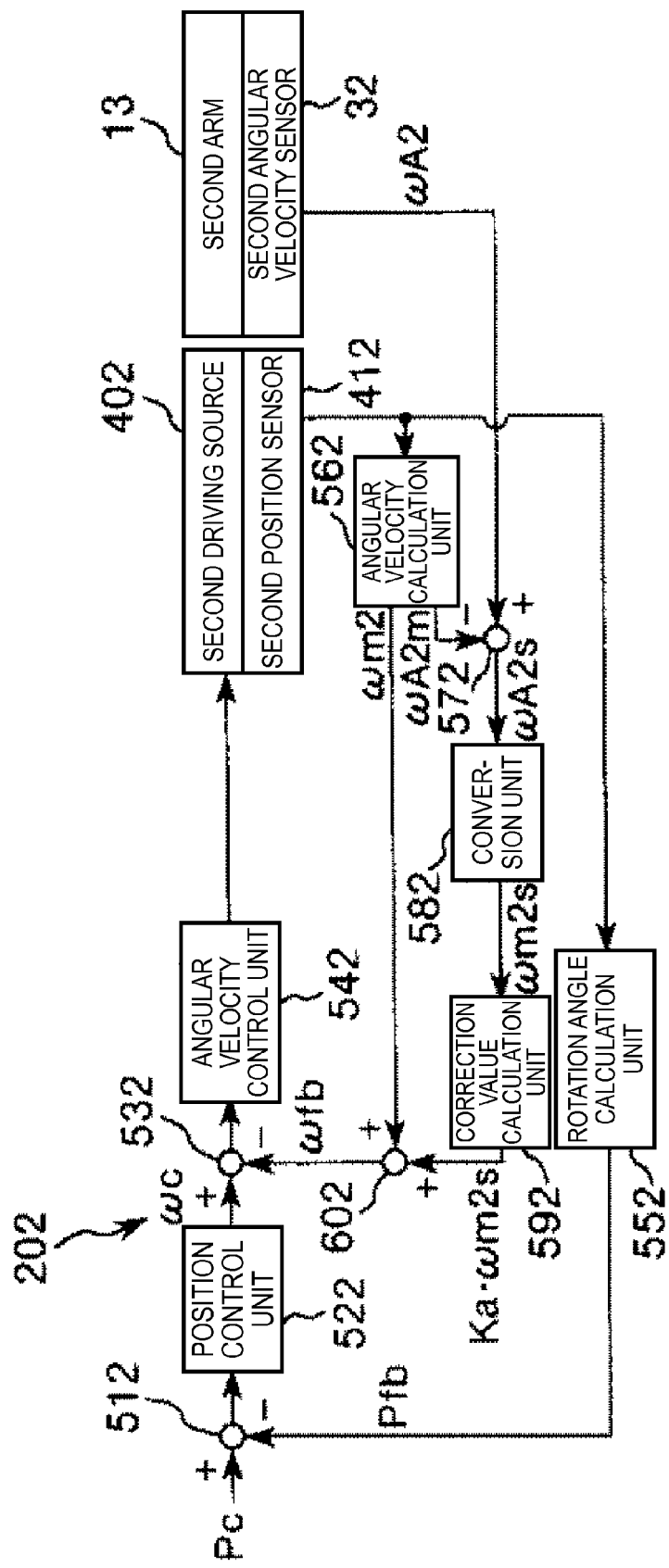
FIG. 13 is a block diagram of a part of the robot shown in FIG. 1.

As shown in FIG. 13, the second driving source control unit 202 has a subtracter 512, a position control unit 522, a subtracter 532, an angular velocity control unit 542, a rotation angle calculation unit 552, an angular velocity calculation unit 562, a subtracter 572, a conversion unit 582, a correction value calculation unit 592, and an adder 602.

Figure 14:
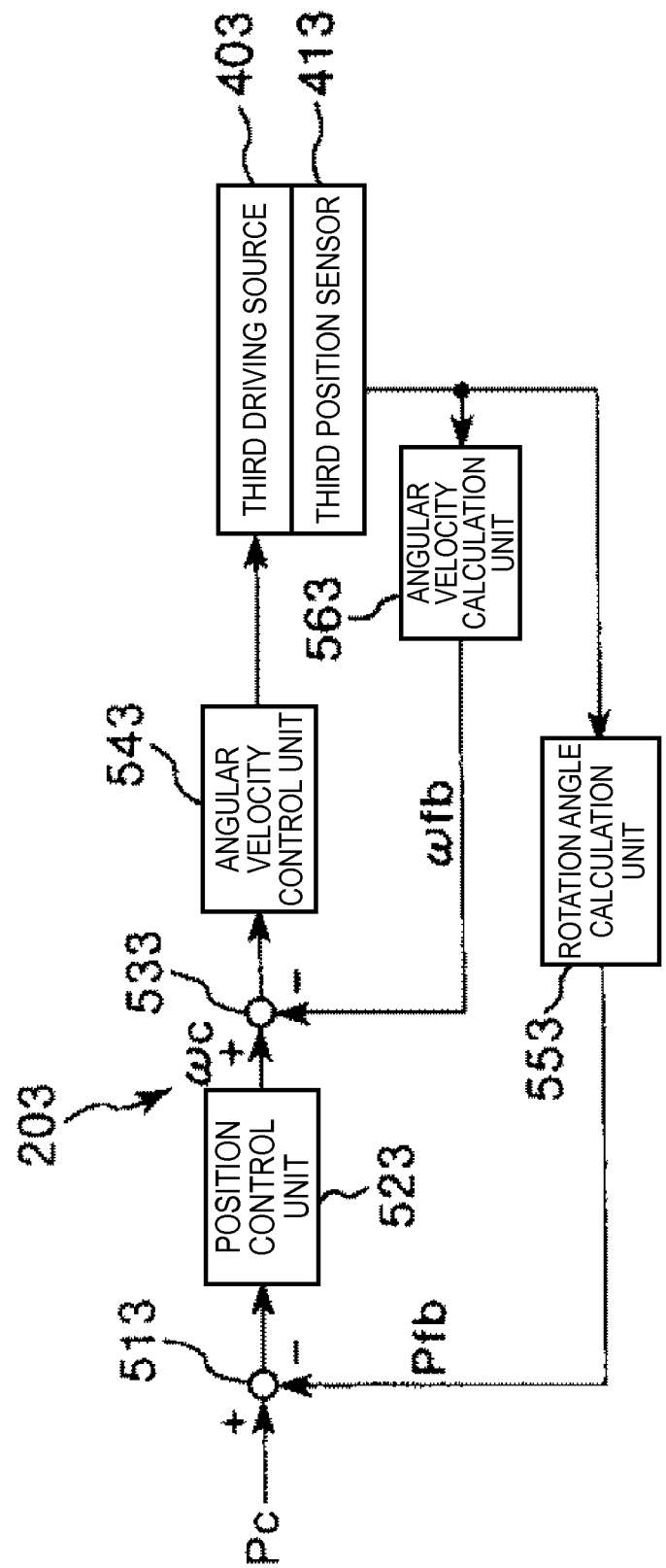
FIG. 14 is a block diagram of a part of the robot shown in FIG. 1.

As shown in FIG. 14, the third driving source control unit 203 has a subtracter 513, a position control unit 523, a subtracter 533, an angular velocity control unit 543, a rotation angle calculation unit 553, and an angular velocity calculation unit 563.

Figure 15:
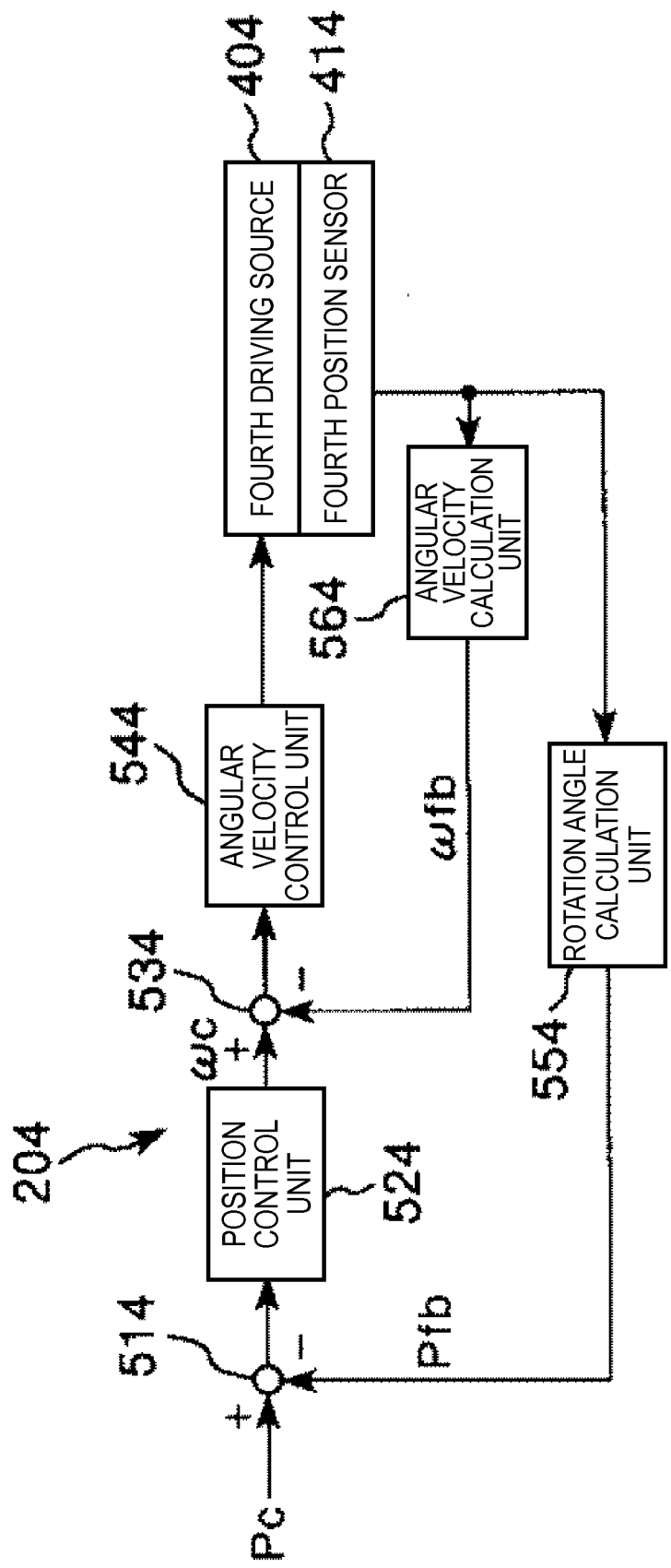
FIG. 15 is a block diagram of a part of the robot shown in FIG. 1.

As shown in FIG. 15, the fourth driving source control unit 204 has a subtracter 514, a position control unit 524, a subtracter 534, an angular velocity control unit 544, a rotation angle calculation unit 554, and an angular velocity calculation unit 564.

Figure 16:
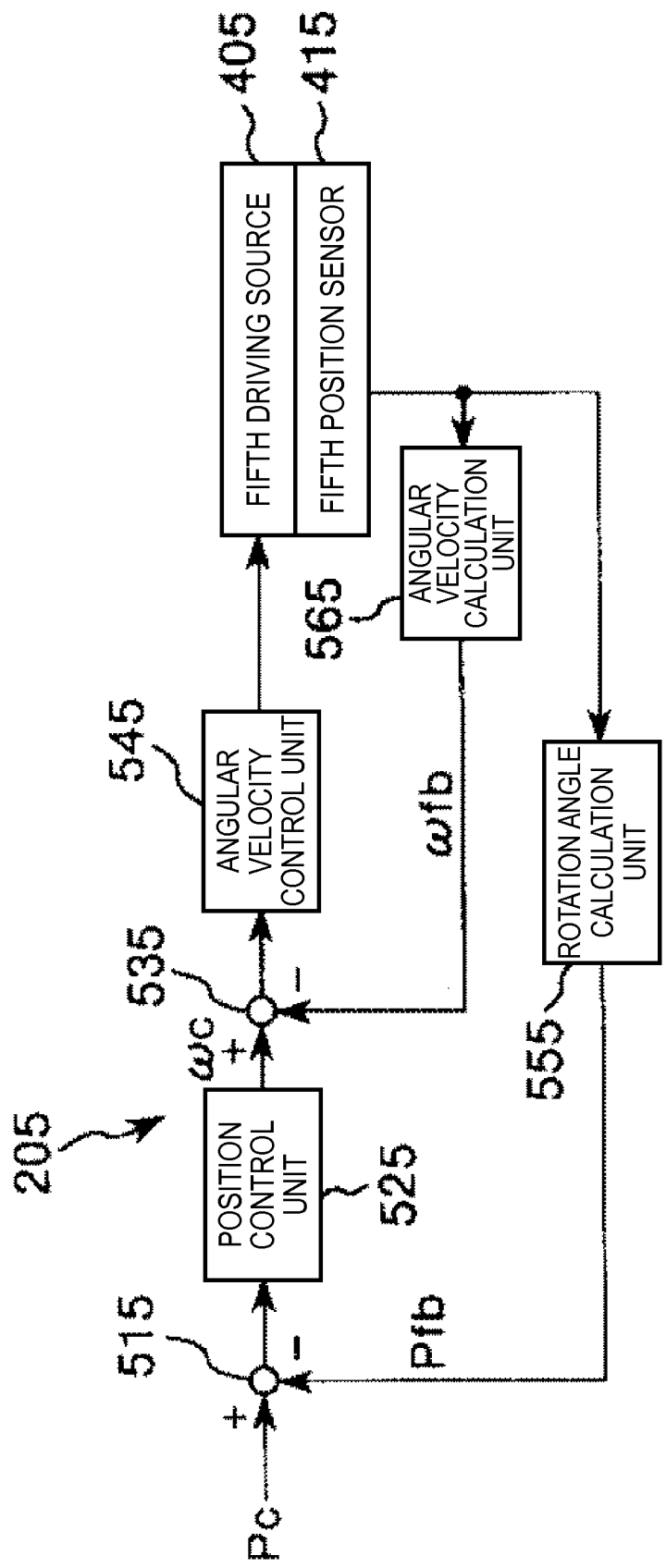
FIG. 16 is a block diagram of a part of the robot shown in FIG. 1.

As shown in FIG. 16, the fifth driving source control unit 205 has a subtracter 515, a position control unit 525, a subtracter 535, an angular velocity control unit 545, a rotation angle calculation unit 555, and an angular velocity calculation unit 565.

Figure 17:
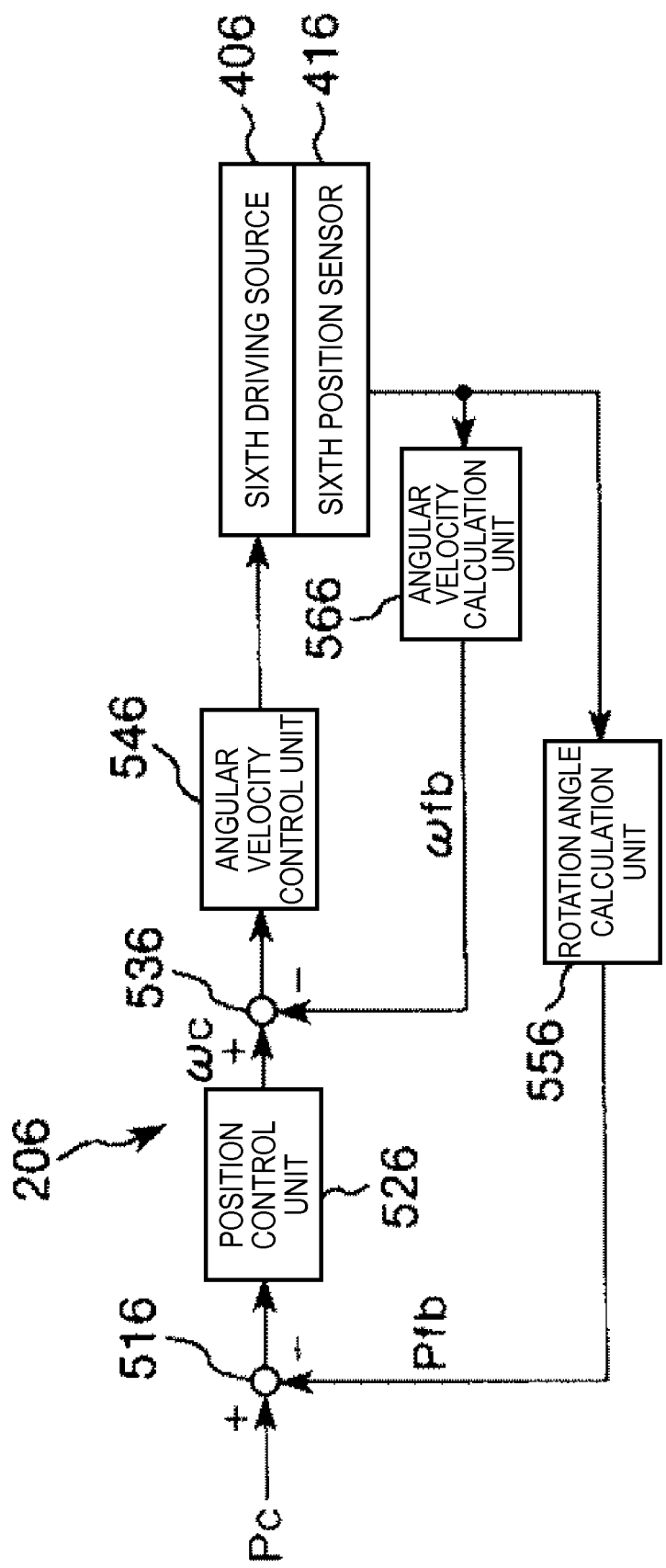
FIG. 17 is a block diagram of a part of the robot shown in FIG. 1.

As shown in FIG. 17, the sixth driving source control unit 206 has a subtracter 516, a position control unit 526, a subtracter 536, an angular velocity control unit 546, a rotation angle calculation unit 556, and an angular velocity calculation unit 566.

Here, the robot control device 20 calculates a target position of the wrist 16 on the basis of the content of processing performed by the robot 1, and produces a track for moving the wrist 16 to the target position. The robot control device 20 measures the rotation angle of each of the driving sources 401 to 406 at every predetermined control period such that the wrist 16 moves along the produced track, and outputs values calculated on the basis of the measurement results to the driving source control units 201 to 206 as a position command Pc of each of the driving sources 401 to 406 (see FIGS. 12 to 17). In the above and following description, the description "the values are input and output" or the like means that "signals corresponding to the values are input and output".

As shown in FIG. 12, in addition to the position command Pc of the first driving source 401, the detection signals from the first position sensor 411 and the first angular velocity sensor 31 are input to the first driving source control unit 201. The first driving source control unit 201 drives the first driving source 401 by feedback control using the respective detection signals such that the rotation angle (position feedback value Pfb) of the first driving source calculated from the detection signal of the first position sensor 411 becomes the position command Pc and a below-described angular velocity feedback value ωfb becomes a below-described angular velocity command ωc.

That is, the position command Pc and a below-described position feedback value Pfb from the rotation angle calculation unit 551 are input to the subtracter 511 of the first driving source control unit 201. In the rotation angle calculation unit 551, the number of pulses input from the first position sensor 411 is counted, and the rotation angle of the first driving source 401 according to the count value is output to the subtracter 511 as the position feedback value Pfb. The subtracter 511 outputs the deviation (the value obtained by subtracting the position feedback value Pfb from a target value of the rotation angle of the first driving source 401) between the position command Pc and the position feedback value Pfb to the position control unit 521.

The position control unit 521 performs predetermined calculation processing using the deviation input from the subtracter 511, and a proportional gain or the like as a preset coefficient, and calculates a target value of the angular velocity of the first driving source 401 according to the deviation.

The position control unit 521 outputs a signal representing the target value (command value) of the angular velocity of the first driving source 401 to the subtracter 531 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 531. The subtracter 531 outputs the deviation (the value obtained by subtracting the angular velocity feedback value ωfb from the target value of the angular velocity of the first driving source 401) between the angular velocity command ωc and the angular velocity feedback value ωfb to the angular velocity control unit 541.

The angular velocity control unit 541 performs predetermined calculation processing including integration using the deviation input from the subtracter 531, and a proportional gain, an integral gain, and the like as preset coefficients, produces a driving signal (driving current) of the first driving source 401 according to the deviation, and supplies the driving signal to the motor 401M through the motor driver 301. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the first driving source 401 is controlled.

Next, the angular velocity feedback value ωfb in the first driving source control unit 201 will be described.

In the angular velocity calculation unit 561, an angular velocity ωm1 of the first driving source 401 is calculated on the basis of the frequency of a pulse signal input from the first position sensor 411, and the angular velocity ωm1 is output to the adder 601.

In the angular velocity calculation unit 561, an angular velocity ωA1m around the first rotating axis O1 of the first arm 12 is calculated on the basis of the frequency of the pulse signal input from the first position sensor 411, and the angular velocity ωA1m is output to the subtracter 571. The angular velocity ωA1m is a value obtained by dividing the angular velocity ωm1 by a reduction ratio between the motor 401M of the first driving source 401 and the first arm 12, that is, in the joint 171.

The angular velocity around the first rotating axis O1 of the first arm 12 is detected by the first angular velocity sensor 31. The detection signal of the first angular velocity sensor 31, that is, the angular velocity ωA1 around the first rotating axis O1 of the first arm 12 detected by the first angular velocity sensor 31 is output to the subtracter 571.

The angular velocity ωA1 and the angular velocity ωA1m are input to the subtracter 571, and the subtracter 571 outputs a value ωA1s (=ωA1−ωA1m) obtained by subtracting the angular velocity ωA1m from the angular velocity ωA1 to the conversion unit 581. The value ωA1s corresponds to a vibrational component (vibrational angular velocity) of the angular velocity around the first rotating axis O1 of the first arm 12. Hereinafter, ωA1s is referred to as a vibrational angular velocity. In this embodiment, feedback control is performed to return a below-described gain Ka multiple of the vibrational angular velocity ωA1s (in detail, an angular velocity ωm1s in the motor 401M which is a value produced on the basis of the vibrational angular velocity ωA1s) to the input side of the first driving source 401. Specifically, the feedback control is performed on the first driving source 401 such that the vibrational angular velocity ωA1s becomes 0 as much as possible. Accordingly, it is possible to suppress vibration of the robot 1. In the feedback control, the angular velocity of the first driving source 401 is controlled.

The conversion unit 581 converts the vibrational angular velocity ωA1s to the angular velocity ωm1s in the first driving source 401, and outputs the angular velocity ωm1s to the correction value calculation unit 591. The conversion can be performed by multiplying the vibrational angular velocity ωA1s by a reduction ratio between the motor 401M of the first driving source 401 and the first arm 12, that is, in the joint 171.

The correction value calculation unit 591 multiplies the angular velocity ωm1s by the gain (feedback gain) Ka as a preset coefficient, obtains a correction value Ka·ωm1s, and outputs the correction value Ka·ωm1s to the adder 601.

The angular velocity ωm1 and the correction value Ka·ωm1s are input to the adder 601. The adder 601 outputs the sum of the angular velocity ωm1 and the correction value Ka·ωm1s to the subtracter 531 as the angular velocity feedback value ωfb. A subsequent operation is as described above.

As shown in FIG. 13, in addition to the position command Pc of the second driving source 402, the detection signals from the second position sensor 412 and the second angular velocity sensor 32 are input to the second driving source control unit 202. The second driving source control unit 202 drives the second driving source 402 by feedback control using the respective detection signals such that the rotation angle (position feedback value Pfb) of the second driving source calculated from the detection signal of the second position sensor 412 becomes the position command Pc and a below-described angular velocity feedback value ωfb becomes a below-described angular velocity command ωc.

That is, the position command Pc and a below-described position feedback value Pfb from the rotation angle calculation unit 552 are input to the subtracter 512 of the second driving source control unit 202. In the rotation angle calculation unit 552, the number of pulses input from the second position sensor 412 is counted, and the rotation angle of the second driving source 402 according to the count value is output to the subtracter 512 as the position feedback value Pfb. The subtracter 512 outputs the deviation (the value obtained by subtracting the position feedback value Pfb from a target value of the rotation angle of the second driving source 402) between the position command Pc and the position feedback value Pfb to the position control unit 522.

The position control unit 522 performs predetermined calculation processing using the deviation input from the subtracter 512, and a proportional gain or the like as a preset coefficient, and calculates the target value of the angular velocity of the second driving source 402 according to the deviation. The position control unit 522 outputs a signal representing the target value (command value) of the angular velocity of the second driving source 402 to the subtracter 532 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 532. The subtracter 532 outputs the deviation (the value obtained by subtracting the angular velocity feedback value ωfb from the target value of the angular velocity of the second driving source 402) between the angular velocity command ωc and the angular velocity feedback value ωfb to the angular velocity control unit 542.

The angular velocity control unit 542 performs predetermined calculation processing including integration using the deviation input from the subtracter 532, and a proportional gain, an integral gain, and the like as preset coefficients, produces a driving signal (driving current) of the second driving source 402 according to the deviation, and supplies the driving signal to the motor 402M through the motor driver 302. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command Wc as much as possible, and the driving current of the second driving source 402 is controlled.

Next, the angular velocity feedback value ωfb in the second driving source control unit 202 will be described.

In the angular velocity calculation unit 562, an angular velocity ωm2 of the second driving source 402 is calculated on the basis of the frequency of a pulse signal input from the second position sensor 412, and the angular velocity ωm2 is output to the adder 602.

In the angular velocity calculation unit 562, an angular velocity ωA2m around the second rotating axis O2 of the second arm 13 is calculated on the basis of the frequency of the pulse signal input from the second position sensor 412, and the angular velocity ωA2m is output to the subtracter 572. The angular velocity ωA2m is a value obtained by dividing the angular velocity ωm2 by a reduction ratio between the motor 402M of the second driving source 402 and the second arm 13, that is, in the joint 172.

The angular velocity around the second rotating axis O2 of the second arm 13 is detected by the second angular velocity sensor 32. The detection signal of the second angular velocity sensor 32, that is, the angular velocity ωA2 around the second rotating axis O2 of the second arm 13 detected by the second angular velocity sensor 32 is output to the subtracter 572. Since the second rotating axis O2 is orthogonal to the first rotating axis O1, it is possible to obtain the angular velocity around the second rotating axis O2 of the second arm 13 easily and reliably without being affected by operation or vibration of the first arm 12.

The angular velocity ωA2 and the angular velocity ωA2m are input to the subtracter 572, and the subtracter 572 outputs a value ωA2s (=ωA2−ωA2m) obtained by subtracting the angular velocity ωA2m from the angular velocity ωA2 to the conversion unit 582. As described above, since the second angular velocity sensor 32 also detects the vibrational component of the angular velocity of the third arm 14, the value ωA2s corresponds to the total of the vibrational component (vibrational angular velocity) of the angular velocity around the second rotating axis O2 of the second arm 13 and the vibrational component (vibrational angular velocity) of the angular velocity around the third rotating axis O3 of the third arm 14. Hereinafter, ωA2s is referred to as a vibrational angular velocity. In this embodiment, feedback control is performed to return a below-described gain Ka multiple of the vibrational angular velocity ωA2s (in detail, an angular velocity ωm2s in the motor 402M which is a value produced on the basis of the vibrational angular velocity ωA2s) to the input side of the second driving source 402. Specifically, the feedback control is performed on the second driving source 402 such that the vibrational angular velocity ωA2s becomes close to 0 as much as possible. Accordingly, it is possible to suppress vibration of the robot 1. In the feedback control, the angular velocity of the second driving source 402 is controlled.

The conversion unit 582 converts the vibrational angular velocity ωA2s to the angular velocity ωm2s in the second driving source 402, and outputs the angular velocity ωm2s to the correction value calculation unit 592. The conversion can be performed by multiplying the vibrational angular velocity ωA2s by a reduction ratio between the motor 402M of the second driving source 402 and the second arm 13, that is, in the joint 172.

The correction value calculation unit 592 multiplies the angular velocity ωm2s by the gain (feedback gain) Ka as a preset coefficient, obtains a correction value Ka·ωm2s, and outputs the correction value Ka·ωm2s to the adder 602.

The angular velocity ωm2 and the correction value Ka·ωm2s are input to the adder 602. The adder 602 outputs the sum of the angular velocity ωm2 and the correction value Ka·ωm2s to the subtracter 532 as the angular velocity feedback value ωfb. A subsequent operation is as described above.

As shown in FIG. 14, in addition to the position command Pc of the third driving source 403, the detection signal from the third position sensor 413 is input to the third driving source control unit 203. The third driving source control unit 203 drives the third driving source 403 by feedback control using the respective detection signals such that the rotation angle (position feedback value Pfb) of the third driving source 403 calculated from the detection signal of the third position sensor 413 becomes the position command Pc and a below-described angular velocity feedback value ωfb becomes a below-described angular velocity command ωc.

That is, the position command Pc and a below-described position feedback value Pfb from the rotation angle calculation unit 553 are input to the subtracter 513 of the third driving source control unit 203. In the rotation angle calculation unit 553, the number of pulses input from the third position sensor 413 is counted, and the rotation angle of the third driving source 403 according to the count value is output to the subtracter 513 as the position feedback value Pfb. The subtracter 513 outputs the deviation (the value obtained by subtracting the position feedback value Pfb from a target value of the rotation angle of the third driving source 403) between the position command Pc and the position feedback value Pfb to the position control unit 523.

The position control unit 523 performs predetermined calculation processing using the deviation input from the subtracter 513, and a proportional gain or the like as a preset coefficient, and calculates a target value of the angular velocity of the third driving source 403 according to the deviation. The position control unit 523 outputs a signal representing the target value (command value) of the angular velocity of the third driving source 403 to the subtracter 533 as the angular velocity command ωc. Here, in this embodiment, although proportional control (P control) is performed as feedback control, the invention is not limited thereto.

In the angular velocity calculation unit 563, the angular velocity of the third driving source 403 is calculated on the basis of the frequency of a pulse signal input from the third position sensor 413, and the angular velocity is output to the subtracter 533 as the angular velocity feedback value ωfb.

The angular velocity command ωc and the angular velocity feedback value ωfb are input to the subtracter 533. The subtracter 533 outputs the deviation (the value obtained by subtracting the angular velocity feedback value ωfb from the target value of the angular velocity of the third driving source 403) between the angular velocity command ωc and the angular velocity feedback value ωfb to the angular velocity control unit 543.

The angular velocity control unit 543 performs predetermined calculation processing including integration using the deviation input from the subtracter 533, and a proportional gain, an integral gain, and the like as preset coefficients, produces a driving signal (driving current) of the third driving source 403 according to the deviation, and supplies the driving signal to the motor 403M through the motor driver 303. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the third driving source 403 is controlled.

The driving source control units 204 to 206 are the same as the third driving source control unit 203, and thus, description thereof will not be repeated.

As described above, in the robot 1 and the robot system 10, the angular velocity of the first arm 12 can be detected by the first angular velocity sensor 31, and since the third rotating axis O3 is parallel to the second rotating axis O2, the angular velocity of the second arm 13 including the vibrational component of the angular velocity of the third arm 14 can be detected by the second angular velocity sensor 32. Then, it is possible to suppress vibration on the basis of these detection results.

Even if the posture of the robot 1 changes, the detection axis of the first angular velocity sensor 31 is constant. For this reason, it is not necessary to correct the angular velocity of the first arm 12 detected by the first angular velocity sensor 31 with the direction of the first angular velocity sensor 31.

Since the second rotating axis O2 is orthogonal to the first rotating axis O1 and is parallel to an axis orthogonal to the first rotating axis O1, even if the posture of the robot 1 changes, for example, even if the first arm 12 rotates, the detection axis of the second angular velocity sensor 32 is constant. For this reason, it is not necessary to correct the angular velocity of the second arm 13 detected by the second angular velocity sensor 32 with the direction of the second angular velocity sensor 32.

Accordingly, complicated and enormous computation is not required. Therefore, a computation error is less likely to occur, and it is possible to reliably suppress vibration and to increase a response speed in the control of the robot 1.

Since the angular velocity of the second arm 13 including the vibrational component of the angular velocity of the third arm 14 is detected by the second angular velocity sensor 32, instead of the angular velocity of the second arm 13, it is possible to more reliably suppress vibration.

It is possible to reduce the number of angular velocity sensors, to reduce cost, and to simplify the configuration compared to a case where the angular velocity sensor is provided in the third arm 14.

The actuation of the second driving source 402 which rotates the second arm 13 on the base end side from the third arm 14 is controlled, whereby it is possible to increase the effect of suppressing vibration of the robot 1.

Although the robot, the robot control device, and the robot system of the invention have been described on the basis of the illustrated embodiment, the invention is not limited to the embodiment, and the configuration of each unit can be substituted with an arbitrary configuration having the same function. Other arbitrary constituent components may be added to the present invention.

As the motor of each driving source, in addition to the servomotor, for example, a stepping motor or the like may be used. If a stepping motor is used as the motor, as a position sensor, for example, a position sensor which measures the number of driving pulses input to the stepping motor so as to detect the rotation angle of the motor may be used.

The type of each position sensor or each angular velocity sensor is not particularly limited, and for example, an optical type, a magnetic type, an electromagnetic type, an electrical type, or the like may be used.

In the foregoing embodiment, although the actuation of the second driving source rotating the second arm is controlled on the basis of the detection result of the second angular velocity sensor, the invention is not limited thereto, and for example, the actuation of the third driving source rotating the third arm may be controlled on the basis of the detection result of the second angular velocity sensor.

In the foregoing embodiment, although the number of rotating axes of the robot is six, the invention is not limited thereto, and the number of rotating axes of the robot may be three, four, five, or seven or more.

That is, in the foregoing embodiment, although, since the wrist has two arms, the number of arms of the robot is six, the invention is not limited thereto, and the number of arms of the robot may be three, four, five, or seven or more.

In the foregoing embodiment, although the robot is a single-arm robot which has an arm connector with a plurality of arms rotatably connected together, the invention is not limited thereto, and for example, the robot may be a robot having a plurality of arm connectors, for example, a double-arm robot which has two arm connectors with a plurality of arms rotatably connected together, or the like.

The entire disclosure of Japanese Patent Application No. 2013-082275 filed Apr. 10, 2013 is expressly incorporated by reference herein.

What is claimed is:

1. A robot comprising:
a base;
a first arm rotatably connected to the base around a first rotating axis;
a second arm rotatably connected to the first arm around a second rotating axis, the second rotating axis being orthogonal to the first rotating axis;
a third arm rotatably connected to the second arm around a third rotating axis, the third rotating axis being parallel to the second rotating axis;
a first angular velocity sensor provided in the first arm, the first angular velocity sensor having a first angular velocity detection axis that is parallel to the first rotating axis; and
a second angular velocity sensor provided in the second arm, the second angular velocity sensor having a second angular velocity detection axis that is parallel to the third rotating axis, wherein:
a distance between the third rotating axis and the second angular velocity sensor is shorter than a distance between the second rotating axis and the second angular velocity sensor.

2. The robot according to claim 1, further comprising:
a speed reducer arranged in at least one of the second arm and the third arm, the speed reducer being located on the third rotating axis.

3. The robot according to claim 1, further comprising:
a first angular velocity sensor unit having a first housing, the first housing accommodating the first angular velocity sensor and a first circuit unit therein, the first circuit unit AD converting and transmitting a signal output from the first angular velocity sensor; and
a second angular velocity sensor unit having a second housing, the second housing accommodating the second angular velocity sensor and a second circuit unit therein, the second circuit unit AD converting and transmitting a signal output from the second angular velocity sensor, wherein the first angular velocity sensor unit is provided in the first arm, and the second angular velocity sensor unit is provided in the second arm.

4. The robot according to claim 3,
wherein the first housing is a first rectangular parallelepiped,
the second housing is a second rectangular parallelepiped,
the first angular velocity detection axis is aligned with a normal to a largest surface of the first rectangular parallelepiped, and
the second angular velocity detection axis is aligned with a normal to a largest surface of the second rectangular parallelepiped.

5. The robot according to claim 3,
wherein each of the first angular velocity sensor and the second angular velocity sensor includes a gyro element,
each gyro element includes:
a base,
a pair of detection vibrating arms which extend from the base parallel to a first axis and in opposite directions,
a pair of connecting arms which extend from the base parallel to a second axis and in opposite directions, and
a pair of driving vibrating arms which extend from front ends or a middle of the connecting arms parallel to the first axis and in opposite directions, and
the first axis is orthogonal to the second axis.

6. The robot according to claim 3,
wherein the first housing has a first attachment portion attached to the first arm, the first attachment portion being in a corner portion of the first housing, and
the second housing has a second attachment portion attached to the second arm, the second attachment portion being in a corner portion of the second housing.

7. The robot according to claim 6, further comprising:
a first conductive fixing member fixing the first attachment portion to the first arm and grounding the first circuit unit to the first arm; and
a second conductive fixing member fixing the second attachment portion to the second arm and grounding the second circuit unit to the second arm.

8. The robot according to claim 3,
wherein the first arm has a housing and an arm-side attachment portion formed integrally with the housing, and
the first angular velocity sensor unit is directly attached to the arm-side attachment portion.

9. The robot according to claim 3,
wherein the second arm has a housing and an arm-side attachment portion formed integrally with the housing, and
the second angular velocity sensor unit is directly attached to the arm-side attachment portion.

10. The robot according to claim 1, further comprising:
a power cable provided in the first arm and adapted to supply power to the robot,
wherein the first angular velocity sensor is arranged in an end portion of the first arm opposite to the cable.

11. The robot according to claim 1, further comprising:
a power cable provided in the second arm and adapted to supply power to the robot,
wherein the second angular velocity sensor is arranged in an end portion of the second arm opposite to the cable.

12. The robot according to claim 1, further comprising:
a fourth arm rotatably connected to the third arm around a fourth rotating axis, the fourth rotating axis being orthogonal to the third rotating axis;
a fifth arm rotatably connected to the fourth arm around a fifth rotating axis, the fifth rotating axis being orthogonal to the fourth rotating axis; and
a sixth arm rotatably connected to the fifth arm around a sixth rotating axis, the sixth rotating axis being orthogonal to the fifth rotating axis.

13. The robot according to claim 1,
wherein the first rotating axis is aligned with a normal of an installation surface of the base.

14. A robot control device which controls the actuation of a robot, the robot including a base, a first arm rotatably connected to the base around a first rotating axis, a second arm rotatably connected to the first arm around a second rotating axis orthogonal to the first rotating axis, and a third arm rotatably connected to the second arm around a third rotating axis parallel to the second rotating axis, the robot control device comprising:
a receiver which receives a first signal and a second signal,
the first signal being output from a first angular velocity sensor provided in the first arm and having a first angular velocity detection axis parallel to the first rotating axis, and
the second signal being output from a second angular velocity sensor provided in the second arm and having a second angular velocity detection axis parallel to the third rotating axis;
a calculator which obtains a first vibrational component of the angular velocity of the first arm and a second vibrational component of the angular velocity of the second arm based on the first signal and the second signal received by the receiver; and
a controller which controls actuation of the robot based on the first vibrational component and the second vibrational component obtained by the calculator.

15. A robot system comprising:
the robot according to claim 1; and
a robot control device which controls actuation of the robot.

16. A robot system comprising:
the robot according to claim 2; and
a robot control device which controls actuation of the robot.

17. A robot system comprising:
the robot according to claim 3; and
a robot control device which controls actuation of the robot.

18. A robot system comprising:
the robot according to claim 4; and
a robot control device which controls actuation of the robot.

* * * * *